US012652401B2

(12) United States Patent
Li et al.

(10) Patent No.: US 12,652,401 B2
(45) Date of Patent: Jun. 9, 2026

(54) NEURAL NETWORK WITH TRANSFORMER BASED VIDEO CODING TOOL

(71) Applicant: QUALCOMM Incorporated, San Diego, CA (US)

(72) Inventors: Yun Li, Ottobrunn (DE); Dmytro Rusanovskyy, San Diego, CA (US); Thomas Alexander Ryder, San Diego, CA (US); Samuel James Eadie, Munich (DE); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/889,977

(22) Filed: Sep. 19, 2024

(65) Prior Publication Data

US 2025/0119556 A1 Apr. 10, 2025

Related U.S. Application Data

(60) Provisional application No. 63/588,232, filed on Oct. 5, 2023.

(51) Int. Cl.
*H04N 19/176* (2014.01)
*G06T 9/00* (2006.01)
(Continued)

(52) U.S. Cl.
CPC ........... *H04N 19/176* (2014.11); *G06T 9/002* (2013.01); *H04N 19/117* (2014.11); *H04N 19/159* (2014.11); *H04N 19/82* (2014.11)

(58) Field of Classification Search
CPC ........................... H04N 19/176; H04N 19/117
(Continued)

(56) References Cited

U.S. PATENT DOCUMENTS

2020/0151497 A1* 5/2020 Kojima ..................... G06T 7/11

OTHER PUBLICATIONS

Zhang H et al: "[EE1-related] RTNN: An In-loop Filter Based on Resblock and Transformer", 29. JVET Meeting; Jan. 11, 2023-Jan. 20, 2023; Teleconference; (The Joint Video Exploration Team of ISO/ IEC JTC1/SC29/WG11 and ITU-T SG.16), No. JVET-AC0156; m61738 Jan. 16, 2023 (Jan. 16, 2023), XP030306771. (Year: 2023).*

(Continued)

*Primary Examiner* — Amir Shahnami
(74) *Attorney, Agent, or Firm* — Shumaker & Sieffert, P. A.

(57) ABSTRACT

A method of processing video data includes receiving a picture; and filtering a current block of the picture, through a neural network and based on local correlations of proximate samples and distant, non-local correlations of non-proximate samples relative to the current block, to generate a filtered current block. The neural network comprises one or more backbone blocks and one or more transformer blocks. Each of the one or more transformer blocks is associated with a backbone block of the one or more backbone blocks. At least one of the backbone blocks is configured to capture the local correlations, relative to the current block and the proximate samples of the current block, and at least one of the transformer blocks is configured to generate features, based on applying an attention mechanism, that capture the distant, non-local correlations, relative to the current block and the non-proximate samples, in the picture for processing.

20 Claims, 32 Drawing Sheets

(51) Int. Cl.
      *H04N 19/117*        (2014.01)
      *H04N 19/159*        (2014.01)
      *H04N 19/82*         (2014.01)
(58) Field of Classification Search
      USPC .................................................... 375/240.08
      See application file for complete search history.

(56)                    References Cited

OTHER PUBLICATIONS

Zamir Syed Waqas et al: "Restormer: Efficient Transformer for High- Resolution Image Restoration", 2022 IEEE/CVF Conference on Computer Vision and Pattern Recognition (CVPR), IEEE, Jun. 18, 2022 (Jun. 18, 2022), pp. 5718-5729, XP034195523, DOI: 10.1109/ CVPR52688.2022.00564 (Year: 2022).*

Alshina E., et al., "Exploration Experiments on Neural Network-based Video Coding (EE1)", Joint Video Experts Team (JVET) of ITU-T SG 16 WP 3 and ISO/IEC JTC 1/SC 29, JVET-AD2023-v2, 30. JVET Meeting, Apr. 21, 2023-Apr. 28, 2023, Antalya, (The Joint Video Exploration Team of ISO/IEC JTC1/SC29/WG11 and ITU-T SG.16 ), No. JVET-AD2023, m63585, May 15, 2023, XP030310800, 12 pages, figure 1.

International Search Report and Written Opinion—PCT/US2024/047716—ISA/EPO—Dec. 17, 2024 (14 pp).

Li Y., et al., "HOP In-loop Filter with Transformer Blocks", Joint Video Experts Team (JVET) of ITU-T SG 16 WP 3 and ISO/IEC JTC 1/SC 29, JVET-AF0158-v3, Oct. 13, 2023-Oct. 20, 2023, Hannover, (The Joint Video Exploration Team of ISO/ IEC JTC1/SC29/WG11 and ITU-T SG.16 ), No. JVET-AF0158, Oct. 19, 2023, XP030312285, 8 Pages, section 2.

Zamir S.W., et al., "Restormer: Efficient Transformer for High-Resolution Image Restoration", 2022 IEEE/CVF, Conference on Computer Vision and Pattern Recognition (CVPR), Jun. 18, 2022, pp. 5728-5739, XP034195523, sections 3 and 3.1 figure 2.

Zhang H., et al., "[EEI-related] RTNN: An In-loop Filter Based on Resblock and Transformer", Joint Video Experts Team (JVET) of ITU-T SG 16 WP 3 and ISO/IEC JTC 1/SC 29, Document: JVET-AC0156-v3, 29. JVET Meeting, Jan. 11, 2023-Jan. 20, 2023, Teleconference, (The Joint Video Exploration Team of ISO/IEC JTC1/SC29/WG11 and ITU-T SG.16 ), No. JVET-AC0156, m61738, Jan. 16, 2023, XP030306771, 6 Pages, sections 1, 2.1 and 3.1 figures 1-3.

Alshina E., et al., "AhG11/AhG14 teleconference", JVET-AG0041-v1, Joint Video Experts Team (JVET) of ITU-T SG 16 WP 3 and ISO/IEC JTC 1/SC 29, 33rd Meeting, Online, Jan. 17-26, 2024, pp. 1-3.

Alshina E., et al., "BoG Report on NN-Filter Design Unification", JVET-AD0380-v7, Joint Video Experts Team (JVET) of ITU-T SG 16 WP 3 and ISO/IEC JTC 1/SC 29, 30th Meeting, Antalya, TR, Apr. 21-28, 2023, pp. 1-12.

Alshina E., et al., "JVET Common Test Conditions and Evaluation Procedures for Neural Network-based Video Coding Technology", JVET-Z2016-v1, 26. JVET Meeting, Apr. 20-29, 2022, (The Joint Video Experts Team of ISO/IEC JTC1/SC29/WP 3 and ITU-T SG.16), pp. 1-10.

Ba J.L., et al., "Layer Normalization", arXiv: 1607.06450v1 [stat. ML], Jul. 21, 2016, pp. 1-14.

Boyce J., et al., "AHG9: Constituent rectangles SEI", JVET-AH0162-v1, Joint Video Experts Team (JVET) of ITU-T SG 16 WP 3 and ISO/IEC JTC 1/SC 29, 34th Meeting, Rennes, FR, Apr. 17-24, 2024, pp. 1-8.

Bross B., et al., "Versatile Video Coding (Draft 10)", JVET-S2001-vH, Joint Video Experts Team (JVET) of ITU-T SG 16 WP 3 and ISO/IEC JTC 1/SC 29/WG 11, 19th Meeting, by teleconference, Jun. 22, 2020-Jul. 1, 2020, 550 Pages.

Chang R., et al., "EE1-1.1: More Refinements on NN Based in-Loop Filter with a Single Model", JVET-AC0194-v1, Joint Video Experts Team (JVET) of ITU-T SG 16 WP 3 and ISO/IEC JTC 1/SC 29, 29th Meeting, by teleconference, Jan. 11-20, 2023, pp. 1-7.

Dumas T., et al., "EE1-3.2: Neural Network-based Intra Prediction with Learned Mapping to VVC Intra Prediction Modes", JVET-AC0116-v1, Joint Video Experts Team (JVET) of ITU-T SG 16 WP 3 and ISO/IEC JTC 1/SC 29, 29th Meeting, by Teleconference, Jan. 11-20, 2023, pp. 1-5.

Eadie S., et al., "EE1-1.9: Reduced Complexity CNN-Based In-loop Filtering", JVET-AC0155-v1, Joint Video Experts Team (JVET) of ITU-T SG 16 WP 3 and ISO/IEC JTC 1/SC 29, 29th Meeting, by teleconference, Jan. 11-21, 2023, pp. 1-4.

Galpin F., et al., "AhG11—EE1-0 High Operation Point model", JVET-AE0191-v6, Pareil Joint Video Experts Team (JVET) of ITU-T SG 16 WP 3 and ISO/IEC JTC 1/SC 29, 31st Meeting, Geneva, CH, Jul. 11-19, 2023, pp. 1-18.

Galpin F., et al., "AhG11: HOP full results", JVET-AF0041-v3, Joint Video Experts Team (JVET) of ITU-T SG 16 WP 3 and ISO/IEC JTC 1/SC 29, 32nd Meeting, Hannover, DE, Oct. 13-20, 2023, pp. 1-11.

Galpin F., et al., "JVET AHG report: NNVC software development AhG14", JVET-AF0014-v1, Joint Video Experts Team (JVET) of ITU-T SG 16 WP 3 and ISO/IEC JTC 1/SC 29, 32nd Meeting, Hannover, DE, Oct. 13-20, 2023, pp. 1-9.

Galpin F., et al., "JVET AHG report: NNVC software development AhG14", JVET-AH0014-v3, Joint Video Experts Team (JVET) of ITU-T SG 16 WP 3 and ISO/IEC JTC 1/SC 29, 34th Meeting, Rennes, FR, Apr. 17-24, 2024, pp. 1-12.

Galpin F., et al., "JVET AHG report: NNVC software development AhG14", JVET-AI0014-v5, Joint Video Experts Team (JVET) of ITU-T SG 16 WP 3 and ISO/IEC JTC 1/SC 29, 35th Meeting, Sapporo, JP, Jul. 12-19, 2024, pp. 1-13.

He K., et al., "Deep Residual Learning for Image Recognition", 2016 IEEE Conference on Computer Vision and Pattern Recognition (CVPR), IEEE, Jun. 27, 2016, 12 Pages, XP033021254, arXiv:1512.03385v1 [cs.CV] Dec. 10, 2015.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Jia J., et al., "AHG11: Deep Reference Frame Generation for Inter Prediction Enhancement", JVET-AB0114-v2, Joint Video Experts Team (JVET) of ITU-T SG 16 WP 3 and ISO/IEC JTC 1/SC 29/WG 11 28th Meeting, Mainz, DE, Oct. 20-28, 2022, pp. 1-6.

Khan S., et al., "Transformers in Vision: A Survey", arXiv:2101.01169v5 [cs.CV] Jan. 19, 2022, pp. 1-30.

Kim S., et al., "I-BERT: Integer-only BERT Quantization", Arxiv.org, arXiv:2101.01321v3, Cornell University Library, 201 Olin Library Cornell University Ithaca, NY 14853, Jun. 8, 2021, 15 Pages.

Lebedev V., et al., "Speeding-up Convolutional Neural Networks Using Fine-tuned CP-Decomposition", arXiv:1412.6553v3 [cs.CV] Apr. 24, 2015, pp. 1-11.

Li (Bytedance) Y., et al., "EEI-Related: In-Loop Filter with Wide Activation and Large Receptive Field", JVET-AC0178-v1, Joint Video Experts Team (JVET) of ITU-T SG 16 WP 3 and ISO/IEC JTC 1/SC 29, 29th Meeting, by Teleconference, Jan. 11-20, 2023, m61760 Jan. 5, 2023, XP030306837, 6 Pages.

Li (Qualcomm) Y., et al., "EE1-Related: Combination test of EE1-1.3.5 and Multi-Scale Component of EE1-1.6", 30. JVET Meeting, Apr. 21, 2023-Apr. 28, 2023, Antalya, The Joint Video Exploration Team of ISO/IEC JTC1/SC29/WG11 and ITU-T SG.16), No. JVET-AD0211, m62893, Apr. 22, 2023, XP030308984, Document: JVET-AD0211-v4, pp. 1-7.

Li Y., et al., "[EE1 related]: Additional inference test for EE1-2.3 to adjust luma-chroma balance", JVET-AH0206-v1, Joint Video Experts Team (JVET) of ITU-T SG 16 WP 3 and ISO/IEC JTC 1/SC 29, 34th Meeting, Rennes, FR, Apr. 17-24, 2024, pp. 1-5.

Li Y., et al., "EE1-1.1: Report on Training with HOP Architecture Change for EE1-0 (Variant 1)", Joint Video Experts Team (JVET)

(56) References Cited

OTHER PUBLICATIONS of ITU-T SG 16 WP 3 and ISO/IEC JTC 1/SC 29, 33rd Meeting, by teleconference, Jan. 17-26, 2024, JVET-AG0174-v1, pp. 1-7.

Li Y., et al., "EE1-1.5: Report on implementation of HOP In-loop filter with Transformer blocks", JVET-AG0162_v1, Joint Video Experts Team (JVET) of ITU-T SG 16 WP 3 and ISO/IEC JTC 1/SC 29, 33rd Meeting, by teleconference, Jan. 17-26, 2024, pp. 1-6.

Li Y., et al., "EE1-1.6: Combined Test of EE1-1.2 and EE1-1.4", JVET-X0066-v1, Joint Video Experts Team (JVET) of ITU-T SG 16 WP 3 and ISO/IEC JTC 1/SC 29, 24th Meeting, by teleconference, Oct. 6-15, 2021, pp. 1-5.

Li Y., et al., "EE1-1.7: Combined Test of EE1-1.6 and EE1-1.3", JVET-Z0113-v2, Joint Video Experts Team (JVET) of ITU-T SG 16 WP 3 and ISO/IEC JTC 1/SC 29, 26th Meeting, by Teleconference, Apr. 20-29, 2022, 7 Pages.

Li Y., et al., "[EE1-2.1: On the detailed analysis of integer Transformer ILF with luma-chroma component balancing and complexity trade-off]", JVET-AI0176-v2, Joint Video Experts Team (JVET) of ITU-T SG 16 WP 3 and ISO/IEC JTC 1/SC 29, 35th Meeting, Sapporo, JP, Jul. 12-19, 2024, pp. 1-13.

Li Y., et al., "EE1-2.2: Wide activation HOP model", JVET-AH0189-v1, Joint Video Experts Team (JVET) of ITU-T SG 16 WP 3 and ISO/IEC JTC 1/SC 29, 34th Meeting, Rennes, FR, Apr. 17-24, 2024, pp. 1-5.

Li Y., et al., "[EE1-2.3: Integer implementation of HOP In-loop filter with Transformer blocks and Attention blocks]", JVET-AH0205-v1, Joint Video Experts Team (JVET) of ITU-T SG 16 WP 3 and ISO/IEC JTC 1/SC 29, 34th Meeting, Rennes, FR, Apr. 17-24, 2024, pp. 1-10.

Li Y., et al., "HOP In-loop filter with transformer blocks", JVET-AF0158-v3, Joint Video Experts Team (JVET) of ITU-T SG 16 WP 3 and ISO/IEC JTC 1/SC 29, 32nd Meeting, Hannover, DE, Oct. 13-20, 2023, pp. 1-8.

Rusanovskyy D., et al., "EE1-1.2 Complexity-Performance Tradeoff of Decomposition", JVET-AE0164-v2, Joint Video Experts Team (JVET) of ITU-T SG 16 WP 3 and ISO/IEC JTC 1/SC 29, 31st Meeting, Geneva, CH, Jul. 11-19, 2023, pp. 1-6.

Rusanovskyy D., et al., "Unified LOP Filter Design, Training Procedure and Filter Usage", JVET-AE0281-v1, Joint Video Experts Team (JVET) of ITU-T SG 16 WP 3 and ISO/IEC JTC 1/SC 29 31st Meeting, Geneva, CH, Jul. 11-19, 2023, pp. 1-5.

Santamaria M., et al., "EE1-1.11: Content-adaptive Post-filter", JVET-AC0055-v2, Joint Video Experts Team (JVET) of ITU-T SG 16 WP 3 and ISO/IEC JTC 1/SC 29 29th Meeting, by teleconference, Jan. 11-20, 2023, pp. 1-7.

Seregin V., et al., "EE2: Summary Report on Enhanced Compression beyond VVC Capability", JVET-AD0023-v1, Joint Video Experts Team (JVET) of ITU-T SG 16 WP 3 and ISO/IEC JTC 1/SC 29, 30th Meeting, Antalya, TR, Apr. 21-28, 2023, pp. 1-35.

Wang L., et al., "EE1-1.2: Neural Network Based In-loop Filter with a Single Model", JVET-Z0091-v4, Joint Video Experts Team (JVET) of ITU-T SG 16 WP 3 and ISO/IEC JTC 1/SC 29, 26th Meeting, by teleconference, Apr. 20-29, 2022, 7 Pages.

Wang Y., et al., "AdderNet and Its Minimalist Hardware Design for Energy-Efficient Artificial Intelligence", arXiv:2101.10015v2 [cs. LG] Feb. 3, 2021, pp. 1-14.

Zhang H., et al., "Self-Attention Generative Adversarial Networks", arXiv:1805.08318v2 [stat.ML] Jun. 14, 2019, 10 Pages.

* cited by examiner

400

PREDICT CURRENT BLOCK

402

CALCULATE RESIDUAL BLOCK FOR CURRENT BLOCK

404

TRANSFORM AND QUANTIZE RESIDUAL BLOCK

406

SCAN TRANSFORM COEFFICIENTS OF RESIDUAL BLOCK

408

ENTROPY ENCODE TRANSFORM COEFFICIENTS

410

OUTPUT ENTROPY ENCODED DATA OF BLOCK

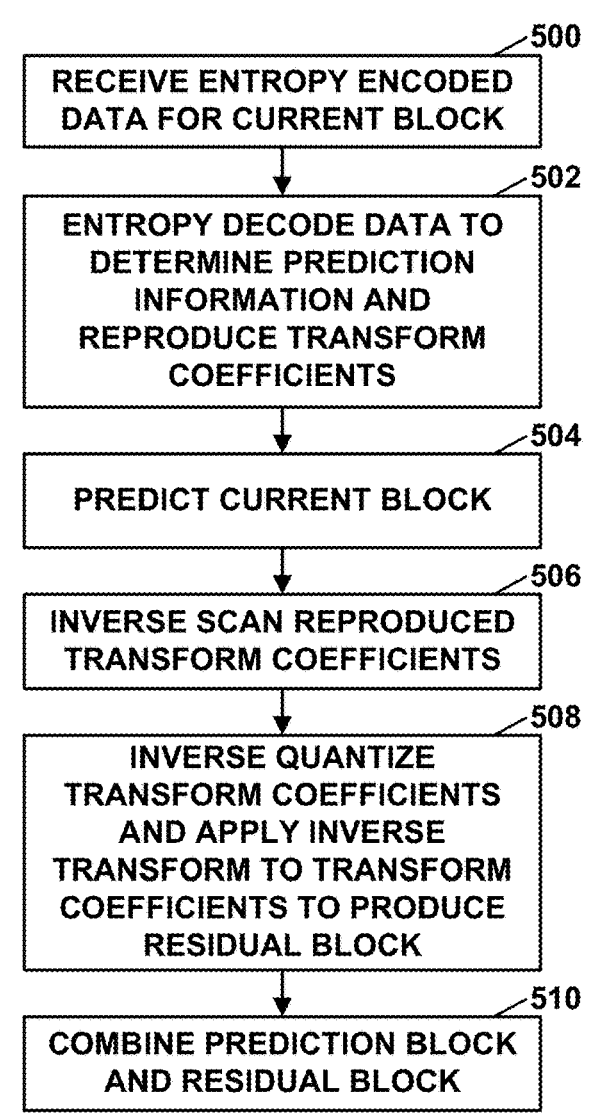

RECEIVE ENTROPY ENCODED DATA FOR CURRENT BLOCK ⟋500

ENTROPY DECODE DATA TO DETERMINE PREDICTION INFORMATION AND REPRODUCE TRANSFORM COEFFICIENTS ⟋502

PREDICT CURRENT BLOCK ⟋504

INVERSE SCAN REPRODUCED TRANSFORM COEFFICIENTS ⟋506

INVERSE QUANTIZE TRANSFORM COEFFICIENTS AND APPLY INVERSE TRANSFORM TO TRANSFORM COEFFICIENTS TO PRODUCE RESIDUAL BLOCK ⟋508

COMBINE PREDICTION BLOCK AND RESIDUAL BLOCK ⟋510

FIG. 31

RECEIVE A PICTURE OF VIDEO DATA     3200

FILTER A CURRENT BLOCK OF THE PICTURE OF THE VIDEO DATA, THROUGH A NEURAL NETWORK AND BASED ON LOCAL CORRELATIONS OF PROXIMATE SAMPLES AND DISTANT, NON-LOCAL CORRELATIONS OF NON-PROXIMATE SAMPLES RELATIVE TO THE CURRENT BLOCK, TO GENERATE A FILTERED CURRENT BLOCK     3202

NEURAL NETWORK WITH TRANSFORMER BASED VIDEO CODING TOOL

This application claims the benefit of U.S. Provisional Patent Application 63/588,232, filed Oct. 5, 2023, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

Video coding techniques include various tools. One example way in which to implement these video coding tools is using neural network (e.g., machine learning (ML)/artificial intelligence (AI)) techniques. This disclosure describes examples of using a transformer block, as part of the neural network, to capture distant, non-local relevance in a picture (e.g., image), such as for in-loop filtering. In this way, the example techniques may improve the operation of the neural network, and in some cases, improve the training of the neural network, resulting in higher visual quality in the pictures that are displayed.

In one example, the disclosure describes a method of processing video data, the method comprising: receiving a picture of the video data; and filtering a current block of the picture of the video data, through a neural network and based on local correlations of proximate samples and distant, non-local correlations of non-proximate samples relative to the current block, to generate a filtered current block, wherein the neural network comprises one or more backbone blocks and one or more transformer blocks, wherein each of the one or more transformer blocks is associated with a backbone block of the one or more backbone blocks, and wherein at least one of the backbone blocks is configured to capture the local correlations, relative to the current block and the proximate samples of the current block, and wherein at least one of the transformer blocks is configured to generate features, based on applying an attention mechanism, that capture the distant, non-local correlations, relative to the current block and the non-proximate samples, in the picture for processing.

In one example, the disclosure describes a device for processing video data, the device comprising: one or more memories configured to store a picture of the video data; and processing circuitry coupled to the one or more memories and configured to: receive a picture of the video data; and filter a current block of the picture of the video data, through a neural network and based on local correlations of proximate samples and distant, non-local correlations of non-proximate samples relative to the current block, to generate a filtered current block, wherein the neural network comprises one or more backbone blocks and one or more transformer blocks, wherein each of the one or more transformer blocks is associated with a backbone block of the one or more backbone blocks, and wherein at least one of the backbone blocks is configured to capture the local correlations, relative to the current block and the proximate samples of the current block, and wherein at least one of the transformer blocks is configured to generate features, based on applying an attention mechanism, that capture the distant, non-local correlations, relative to the current block and the non-proximate samples, in the picture for processing.

In one example, the disclosure describes one or more computer readable storage media storing instructions thereon that when executed cause one or more processors to: receive a picture of video data; and filter a current block of the picture of the video data, through a neural network and based on local correlations of proximate samples and distant, non-local correlations of non-proximate samples relative to the current block, to generate a filtered current block, wherein the neural network comprises one or more backbone blocks and one or more transformer blocks, wherein each of the one or more transformer blocks is associated with a backbone block of the one or more backbone blocks, and wherein at least one of the backbone blocks is configured to capture the local correlations, relative to the current block and the proximate samples of the current block, and wherein at least one of the transformer blocks is configured to generate features, based on applying an attention mechanism, that capture the distant, non-local correlations, relative to the current block and the non-proximate samples, in the picture for processing.

The details of one or more examples are set forth in the accompanying drawings and the description below. Other features, objects, and advantages will be apparent from the description and drawings, and from the claims.

BRIEF DESCRIPTION OF DRAWINGS

FIG. 31 is a flowchart illustrating an example method for decoding a current block in accordance with the techniques of this disclosure.

DETAILED DESCRIPTION

Figure 1:
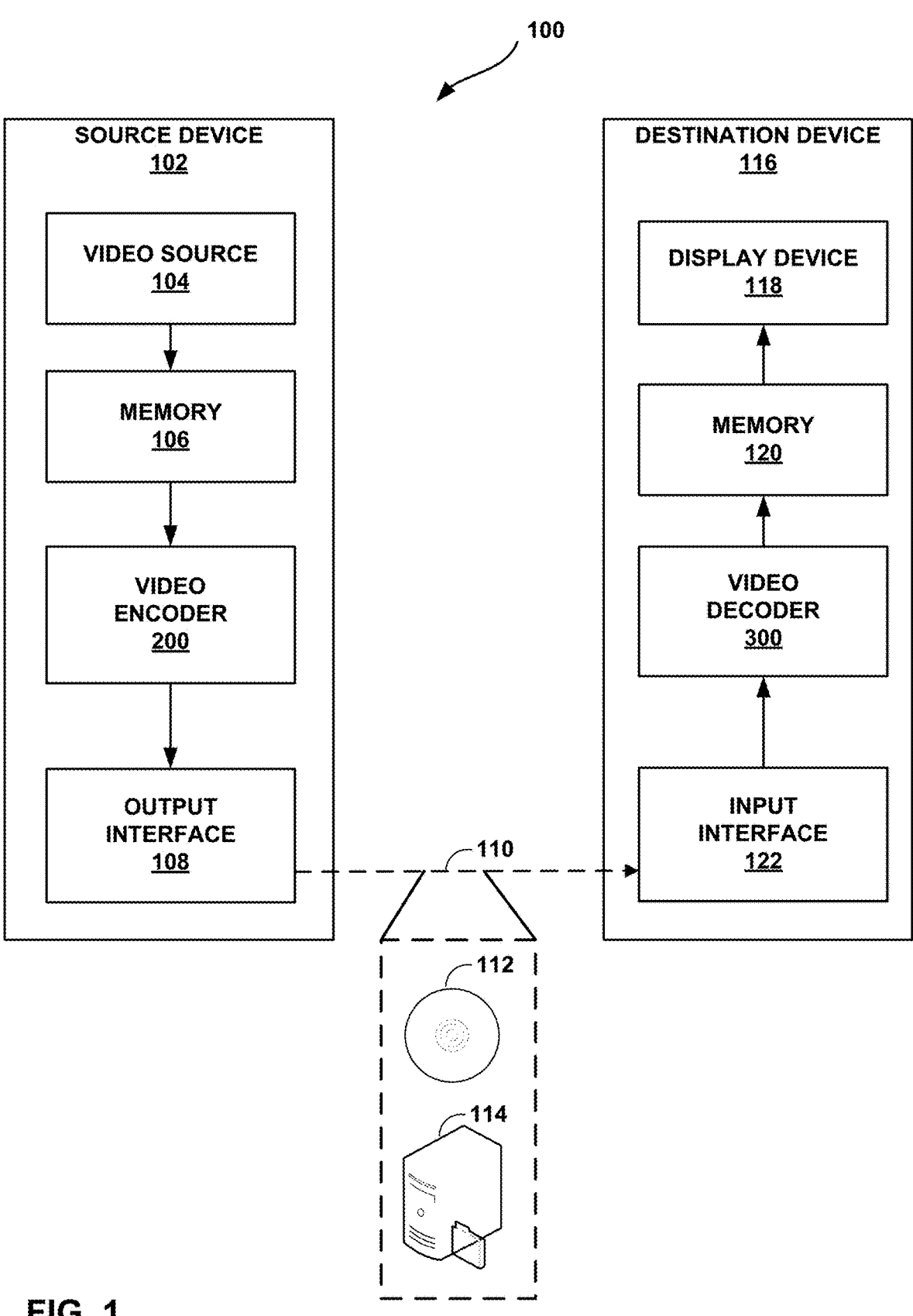
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In both intra prediction and inter prediction, a video encoder generates a prediction block. In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes examples of integration of a transformer block into a neural network (NN). For instance, the neural network may be convolutional neural network (CNN), and may be have residual network (ResNet) architecture. In some examples, the neural network may be for an in-loop filtering (ILF) architecture for purposes of video coding. In some examples, a CNN based filter with ResNet architecture which utilizes cascaded number of residual blocks (RB) may be appropriate for In-Loop filtering. In accordance with one or more examples described in this disclosure, to improve performance of such filter, transformer self-attention mechanism can be utilized to capture distant, non-local relevance in an image.

For ease of description, the example techniques are described as being related to CNN-assisted loop filtering. However, the techniques are applicable to any cascaded CNN-based video coding tool. The example techniques may be used in the context of advanced video codecs, such as extensions of VVC or the next generation of video coding standards, and any other video codecs.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for NN-based video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for NN-based video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories.

In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use neural networks.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered as an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
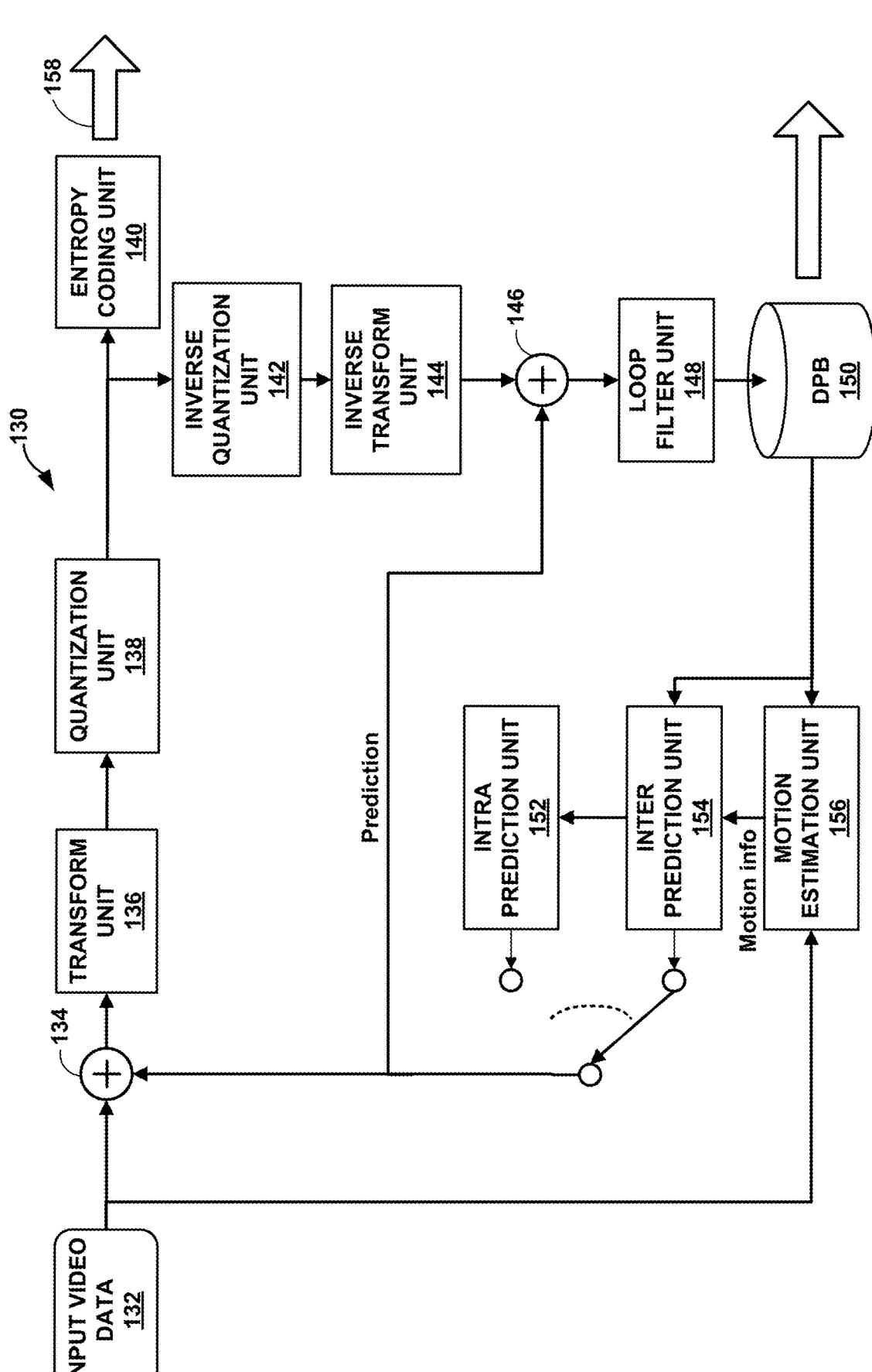
FIG. 2 is a block diagram illustrating an example hybrid video coding framework.

Video encoder 200 and video decoder 300 may be configured to perform in loop filtering. FIG. 2 is a conceptual diagram illustrating a hybrid video coding framework. Video coding standards since H.261 have been based on the so-called hybrid video coding principle, which is illustrated in FIG. 2. The term hybrid refers to the combination of two means to reduce redundancy in the video signal, i.e., prediction and transform coding with quantization of the prediction residual. Whereas prediction and transforms reduce redundancy in the video signal by decorrelation, quantization decreases the data of the transform coefficient representation by reducing their precision, ideally by removing only irrelevant details. This hybrid video coding design principle is also used in the two recent standards, ITU-T H.265/HEVC and ITU-T H.266/VVC.

As shown in FIG. 2, a modern hybrid video coder 130 generally performs block partitioning, motion-compensated or inter-picture prediction, intra-picture prediction, transformation, quantization, entropy coding, and post/in-loop filtering. In the example of FIG. 2, video coder 130 includes summation unit 134, transform unit 136, quantization unit 138, entropy coding unit 140, inverse quantization unit 142, inverse transform unit 144, summation unit 146, loop filter unit 148, decoded picture buffer (DPB) 150, intra prediction unit 152, inter-prediction unit 154, and motion estimation unit 156.

In general, video coder 130 may, when encoding video data, receive input video data 132. Block partitioning is used to divide a received picture (image) of the video data into smaller blocks for operation of the prediction and transform processes. Early video coding standards used a fixed block size, typically 16×16 samples. Recent standards, such as HEVC and VVC, employ tree-based partitioning structures to provide flexible partitioning.

Figure 3:
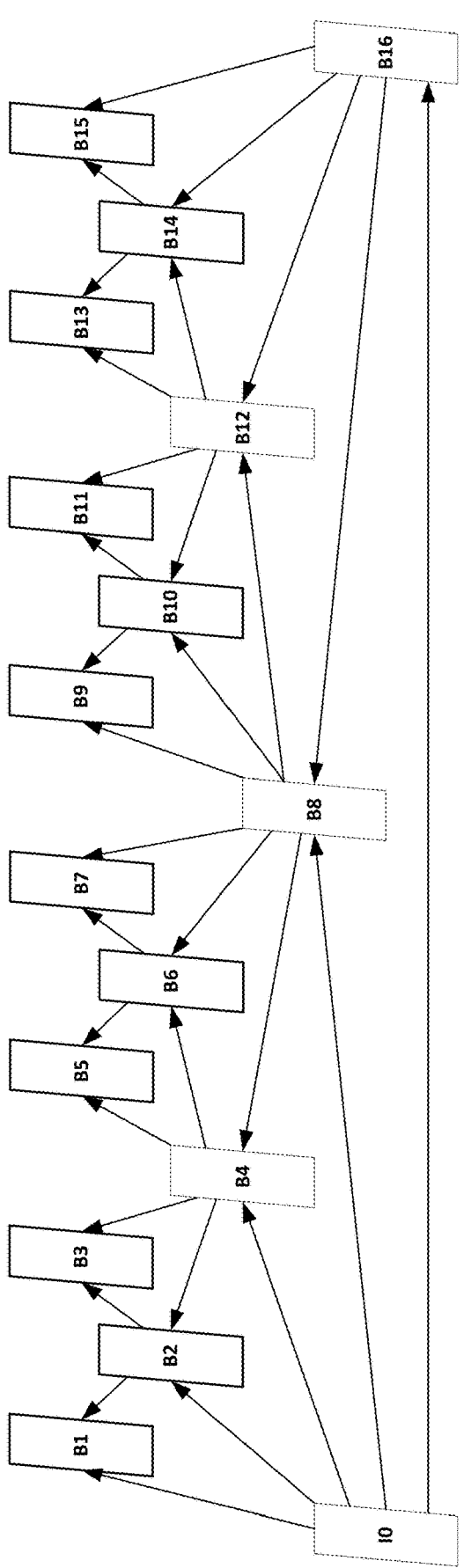
FIG. 3 illustrates an example hierarchical prediction structure with a group of pictures (GOP) size equal to 16.

Motion estimation unit 156 and inter-prediction unit 154 may predict input video data 132, e.g., from previously decoded data of DPB 150. Motion-compensated or inter-picture prediction takes advantage of the redundancy that exists between (hence "inter") pictures of a video sequence. According to block-based motion compensation, which is used in the modern video codecs, the prediction is obtained from one or more previously decoded pictures, i.e., the reference picture(s). The corresponding areas to generate the inter-prediction are indicated by motion information, including motion vectors and reference picture indices. In recent video codec, hierarchical prediction structures inside a group of pictures (GOP) is applied to improve coding efficiency. FIG. 3 illustrates an example hierarchical prediction structure with a GOP size equal to 16.

Intra-picture prediction exploits the spatial redundancy that exists within a picture (hence "intra") by deriving the prediction for a block from already coded/decoded, spatially neighboring (reference) samples. The directional angular prediction, DC prediction and plane or planar prediction are used in the most recent video codec, including AVC, HEVC and VVC.

Hybrid video coding standards may apply a block transform to the prediction residual (regardless of whether it comes from inter- or intra-picture prediction). In early standards, including H.261/262/263, a discrete cosine transform (DCT) is employed. In HEVC and VVC, more transform kernel besides DCT are applied in order to account for different statistics in the specific video signal.

Quantization aims to reduce the precision of an input value or a set of input values in order to decrease the amount of data needed to represent the values. In hybrid video coding, the quantization is typically applied to individual transformed residual samples, e.g., to transform coefficients, resulting in integer coefficient levels. In recent video coding standards, the step size is derived from a so-called quantization parameter (QP) that controls the fidelity and bit rate. A larger step size lowers the bit rate but also deteriorates the quality, which e.g., results in video pictures exhibiting blocking artifacts and blurred details.

Summation unit 134 may calculate residual data as differences between input video data 132 and predicted data from intra prediction unit 152 or inter-prediction unit 154. Summation unit 134 provides residual blocks to transform unit 136, which applies one or more transforms to the residual block to generate transform blocks. Quantization unit 138 quantizes the transform blocks to form quantized transform coefficients. Entropy coding unit 140 entropy encodes the quantized transform coefficients, as well as other syntax elements, such as motion information or intra-prediction information, to generate output bitstream 158.

Meanwhile, inverse quantization unit 142 inverse quantizes the quantized transform coefficients, and inverse transform unit 144 inverse transforms the transform coefficients, to reproduce residual blocks. Summation unit 146 combines the residual blocks with prediction blocks (on a sample-by-sample basis) to produce decoded blocks of video data. Loop filter unit 148 applies one or more filters (e.g., at least one of a neural network-based filter, a neural network-based loop filter, a neural network-based post loop filter, an adaptive in-loop filter, or a pre-defined adaptive in-loop filter) to the decoded block to produce filtered decoded blocks.

Entropy coding unit 140 may perform context-adaptive binary arithmetic coding (CABAC) on encoded video. CABAC is used in recent video codecs, e.g., AVC, HEVC and VVC, due to its high efficiency.

Filtering unit 148 may perform post-loop or in-loop filtering. Post/In-Loop filtering is a filtering process (or combination of such processes) that is applied to the reconstructed picture to reduce the coding artifacts. The input of the filtering process is generally the reconstructed picture, which is the combination of the reconstructed residual signal (which includes quantization error) and the prediction. As shown in FIG. 2, the reconstructed pictures after in-loop filtering are stored in decoded picture buffer (DPB) 150 and are used as a reference for inter-picture prediction of subsequent pictures. The coding artifacts are mostly determined by the QP. Therefore, QP information is generally used in design of the filtering process. In HEVC, the in-loop filters include deblocking filtering and sample adaptive offset (SAO) filtering. In the VVC standard, an adaptive loop filter (ALF) was introduced as a third filter. The filtering process of ALF is as shown below:

$$R'(i, j) = R(i, j) + \left(\left(\sum_{k \neq 0} \sum_{l \neq 0} f(k, l) \times \right. \right. \tag{1}$$

$$K(R(i+k, j+l) - R(i, j), c(k, l)) + 64\right) \gg 7\Big),$$

where can R(i, j) is the samples before filtering process, R'(i, j) is the sample value after filtering process. f(k, l) denotes the filter coefficients, K(x, y) is the clipping function and c(k, l) denotes the clipping parameters. The variable k and l varies between $$-\frac{L}{2} \text{ and } \frac{L}{2}$$

where L denotes the filter length. The clipping function K(x, y)=min (y, max(−y, x)) which corresponds to the function Clip3 (−y, y, x). The clipping operation introduces nonlinearity to make ALF more efficient by reducing the impact of neighbor sample values that are too different with the current sample value. In VVC, the filtering parameters can be signaled in the bit stream, and can be selected from pre-defined filter sets. The ALF filtering process can also be summarized with the following equation:

$$R'(i, j) = R(i, j) + \text{ALF\_residual\_ouput}(R). \tag{2}$$

Video encoder 200 and video decoder 300 may be configured to perform neural network (NN)-based filtering. Embedding neural networks into a hybrid video coding framework may improve compression efficiency. Neural networks have been used for intra prediction and inter prediction to improve the prediction efficiency. In some examples, NN-based filtering process is applied as a postfilter. In such examples, the filtering process is applied to the output picture, and the unfiltered picture may be used as reference picture.

An NN-based filter can be applied additionally to the existing filters, such as deblocking filter, SAO and ALF. NN-based filters can also be applied exclusively or as a replacement filter, where the NN-based filter is designed to replace one or more other existing filters.

Figure 4:
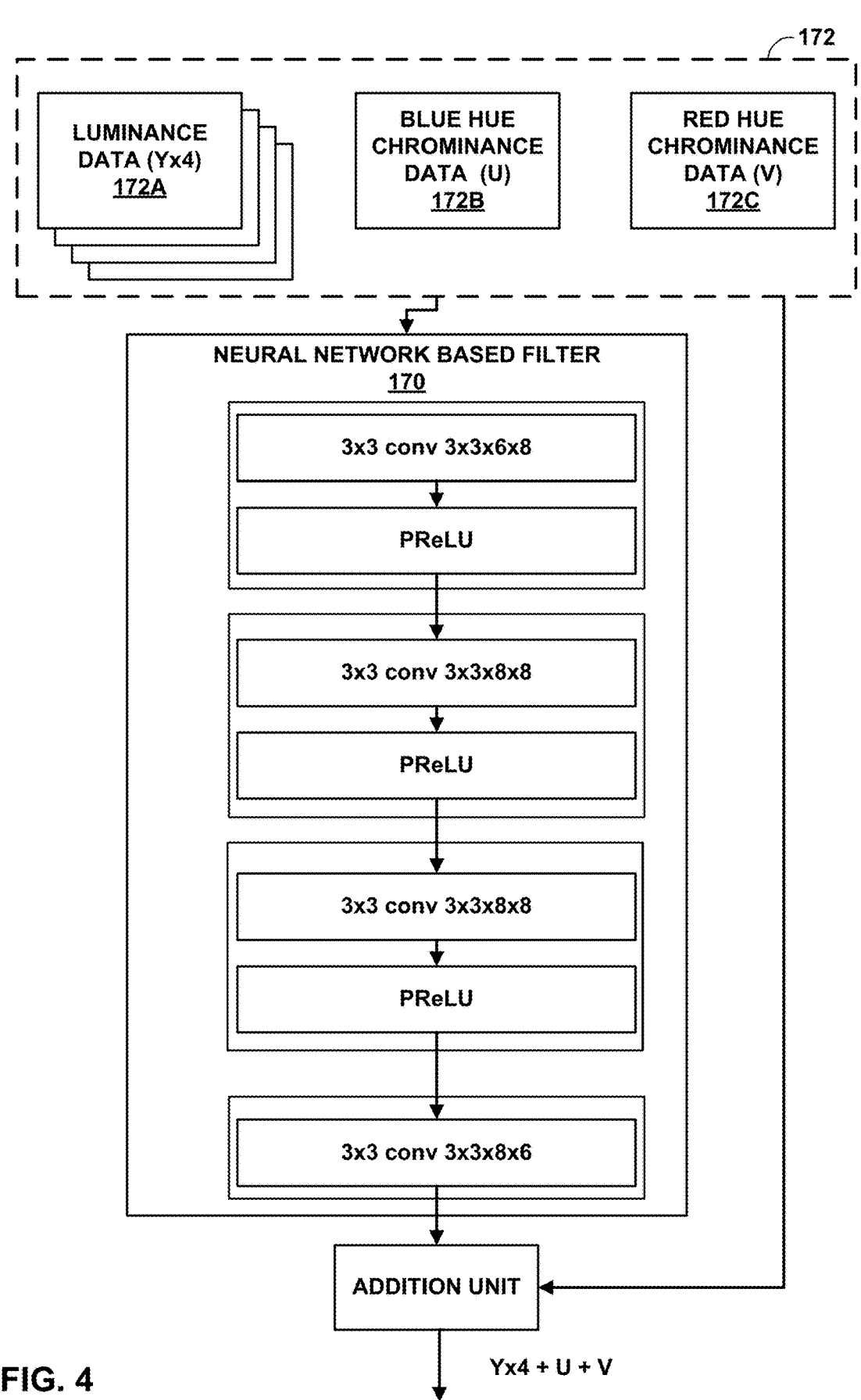
FIG. 4 is a block diagram illustrating an example convolutional neural network (CNN)-based filter with four layers.

An example of an NN-based filter is shown in FIG. 4. FIG. 4 is a block diagram illustrating an example CNN-based filter with four layers. An example NN-based filtering process takes the reconstructed luma and chroma samples, packed in a 3D volume with 6 planes, as inputs. The intermediate outputs are residual samples, which are added back to the input to refine the input samples. The NN filter may use all color components as input to exploit the cross-component correlations. The different components may share the same filters (including network structure and model parameters) or each component may have its own specific filters.

For instance, NN-based filter 170 can be applied in addition to the existing filters, such as deblocking filters, sample adaptive offset (SAO), and/or adaptive loop filtering (ALF). NN-based filters can also be applied exclusively, where NN-based filters are designed to replace all of the existing filters. Additionally, or alternatively, NN-based filters, such as NN-based filter 170, may be designed to supplement, enhance, or replace any or all of the other filters.

The NN-based filtering process of FIG. 4 may take the reconstructed samples (e.g., luma and chroma samples which, in some examples, may be packed in a 3D volume with 6 planes) as inputs, and the intermediate outputs are residual samples, which are added back to the input to refine the input samples. The NN-based filter may use all color components (e.g., Y, U, and V, or Y, Cb, and Cr, e.g., luminance data 172A, blue-hue chrominance 172B, and red-hue chrominance 172C) as inputs 172 to exploit cross-component correlations. Different color components may share the same filter(s) (including network structure and model parameters) or each component may have its own specific filter(s).

The filtering process can also be generalized as follows:

$$R'(i, j) = R(i, j) + \text{NN\_filter\_residual\_ouput}(R) \tag{3}$$

The model structure and model parameters of NN-based filter(s) can be pre-defined and be stored at the encoder and decoder. The filters can also be signaled in the bitstream.

In the example of FIG. 4, the NN-based filter may include a series of feature extraction layers, followed by an output convolution. In FIG. 4, the feature extraction layers may include a 3×3 convolution (conv) layer followed by a parametric rectified linear unit (PReLU) layer. The convolution layer applies a convolution operation to the input data, which involves a filter or kernel sliding over the input data (e.g., the reconstruction samples of input 172) and computing dot products at each position. The convolution operation essentially captures local patterns within the input data. For example, in the context of image processing, these patterns could be edges, textures, or other visual features. The filter or kernel is a small matrix of weights that gets updated during the training process. By sliding this filter across the input data (or feature map from a previous layer) and computing the dot product at each position, the convolution layer creates a feature map that encodes spatial hierarchies and patterns detected in the input.

The output of a convolution layer is a set of feature maps, each corresponding to one filter, capturing different aspects of the input data. This layer helps the neural network to learn increasingly complex and abstract features as the data passes through deeper layers of the network. The first 3×3 in the nomenclature 3×3 conv 3×3×6×8 in FIG. 4 indicates that the convolution layer has a 3×3 filter size (e.g., a 3×3 matrix). 3×3×6×8 refers to both the input and output dimensions of the convolution layer, where 6 is the number of input channels, and 8 is the number of output channels.

The PReLU layer is an activation function used in neural networks, and was introduced as a variant of the ReLU (Rectified Linear Unit) activation function. As described above, the convolution layer outputs feature maps, each corresponding to one filter, representing detected features in the input. Following the convolution layer, the PReLU layer applies the PReLU activation function to each element of the feature maps produced by the convolution layer. For positive values, the PReLU layer acts like a standard ReLU, passing the value through. For negative values, instead of setting them to zero (e.g., as ReLU does), the PReLU layer allows a small, linear, negative output. This keeps the neurons active and maintains the gradient flow, which can be beneficial for learning in deep networks.

In summary, when a convolution layer is followed by a PReLU layer, the convolution layer first extracts features from the input data through a set of learned filters. The resulting feature maps are then passed through the PReLU activation function, which introduces non-linearity and helps to avoid the problem of dying neurons by allowing a small gradient when the inputs are negative. This combination is effective in learning complex patterns in the data while maintaining robust gradient flow, especially beneficial in deeper network architectures.

When NN-based filtering is applied in video coding, the whole video signal (pixel data) might be split into multiple processing units (e.g., 2D blocks), and each processing unit can be processed separately or be combined with other information associated with this block of pixels. The possible choices of a processing unit include a frame, a slice/ tile, a CTU, or any pre-defined or signaled shapes and sizes. Typically, NN-based filtering is performed on reconstructed blocks of video data. Here, reconstructed blocks and samples may refer to both decoded blocks produced by video decoder 300, as well blocks reconstructed in a reconstruction loop of video encoder 200.

To further improve the performance of NN-based filtering, different types of input data can be processed jointly to produce the filtered output. Input data may include, but is not limited to, reconstruction pixels/samples, prediction pixels/ samples, pixels/samples after the loop filter(s), partitioning structure information, deblocking parameters (e.g., boundary strength (BS)), QP values, slice or picture types, or a filters applicability or coding modes map. Input data can be provided at different granularities. Luma reconstruction and prediction samples could be provided at the original resolution, whereas chroma samples could be provided at lower resolution, e.g. for 4:2:0 representation, or can be upsampled to the Luma resolution to achieve per-pixel representation. Similarly, QP, BS, partitioning, or coding mode information can be provided at lower resolution, including cases with a single value per frame, slice or processing block (e.g., QP). In other examples, QP, BS, partitioning, or coding mode information can be expanded (e.g., replicated) to achieve per-pixel/sample representation.

Figure 5:
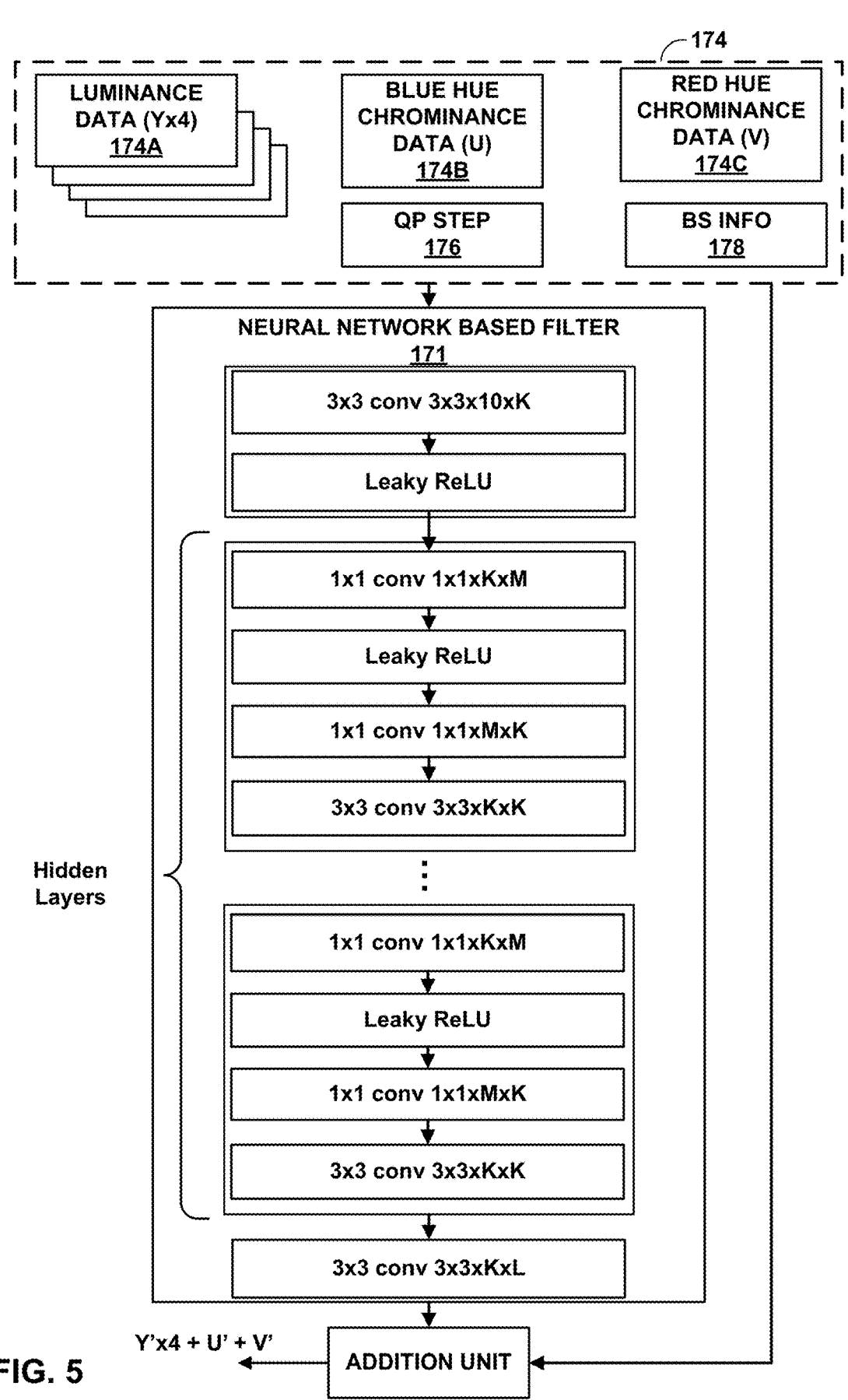
FIG. 5 is a block diagram illustrating an example CNN-based filter with padded input samples and supplementary data.

An example of an architecture utilizing supplementary data is shown in FIG. 5. FIG. 5 is a block diagram illustrating an example CNN-based filter with padded input samples and supplementary data. Pixels of the processing block (4 subblocks of interlaced Luma samples plane and associated Cb and Cr planes) are combined with supplementary information such as QP steps and BS. The area of the processing pixel may be extended with 4 padded pixels from each side. The total size of the processing volume is (4+64+4)×(4+64+4)×(4 Y+2UV+1QP+3BS).

For example, NN-based filter 171 uses pixels/samples of the processing block combined with supplementary data as input 174. The input 174 may include 4 subblocks of interlaced luma samples (Yx4) 174A and associated blue hue chrominance (U) data 174B and red hue chrominance (V) data 174C. The supplementary data includes a quantization parameter (QP) step 176 and a boundary strength (BS) 178. The area of the input pixels/samples may be extended with 4 padded pixels/samples from each side. The resulting dimensions of the processing volume is (4+64+4)×(4+64+4)×(4 Y+2UV+1QP+3BS).

Relative to the NN-based filter in FIG. 4, NN-based filter 171 may include two or more hidden layers that utilize both 1×1 convolutions and a Leaky ReLU layer. A leaky ReLU layer. Similar to a PReLU layer, a Leaky ReLU layer allows a small, non-zero gradient to be output when the layer is not active. Instead of outputting zero for negative inputs, the Leaky ReLU multiplies these inputs by a small constant. This small slope ensures that even neurons that would otherwise be inactive still contribute a small amount to the network's learning, reducing the likelihood of the dying ReLU problem.

Video encoder 200 and video decoder 300 may be configured to perform NN-based filtering with multi-mode design. To further improve the performance of NN-based filtering, multi-mode solutions can be designed. For example, for each processing unit, video encoder 200 may select among a set of modes based on rate-distortion optimization and the choice can be signaled in the bit-stream. The different modes may include different NN models, different values that used as the input information of the NN models, etc. In one example, a video coder (e.g., video encoder 200 or video decoder 300) may use an NN-based filtering solution with multiple modes based on a single NN model by using different QP values as input of the NN model for different modes.

Examples of CNN ILF (in-loop filter) architecture that are being actively developed by JVET will now be described. One such architecture is a multi-mode CNN ILF with attention block. In JVET-Z0113, Y. Li, K. Zhang, L. Zhang, H. Wang, M. Coban, A. M. Kotra, M. Karczewicz, F. Galpin, K. Andersson, J. Ström, D. Liu, R. Sjöberg, EE1-1.7: Combined Test of EE1-1.6 and EE1-1.3, JVET-Z0113, April 2022, an NN based filtering solution with multiple modes is proposed, as described above with respect to the NN-based filtering with multi-mode design.

Figure 6:
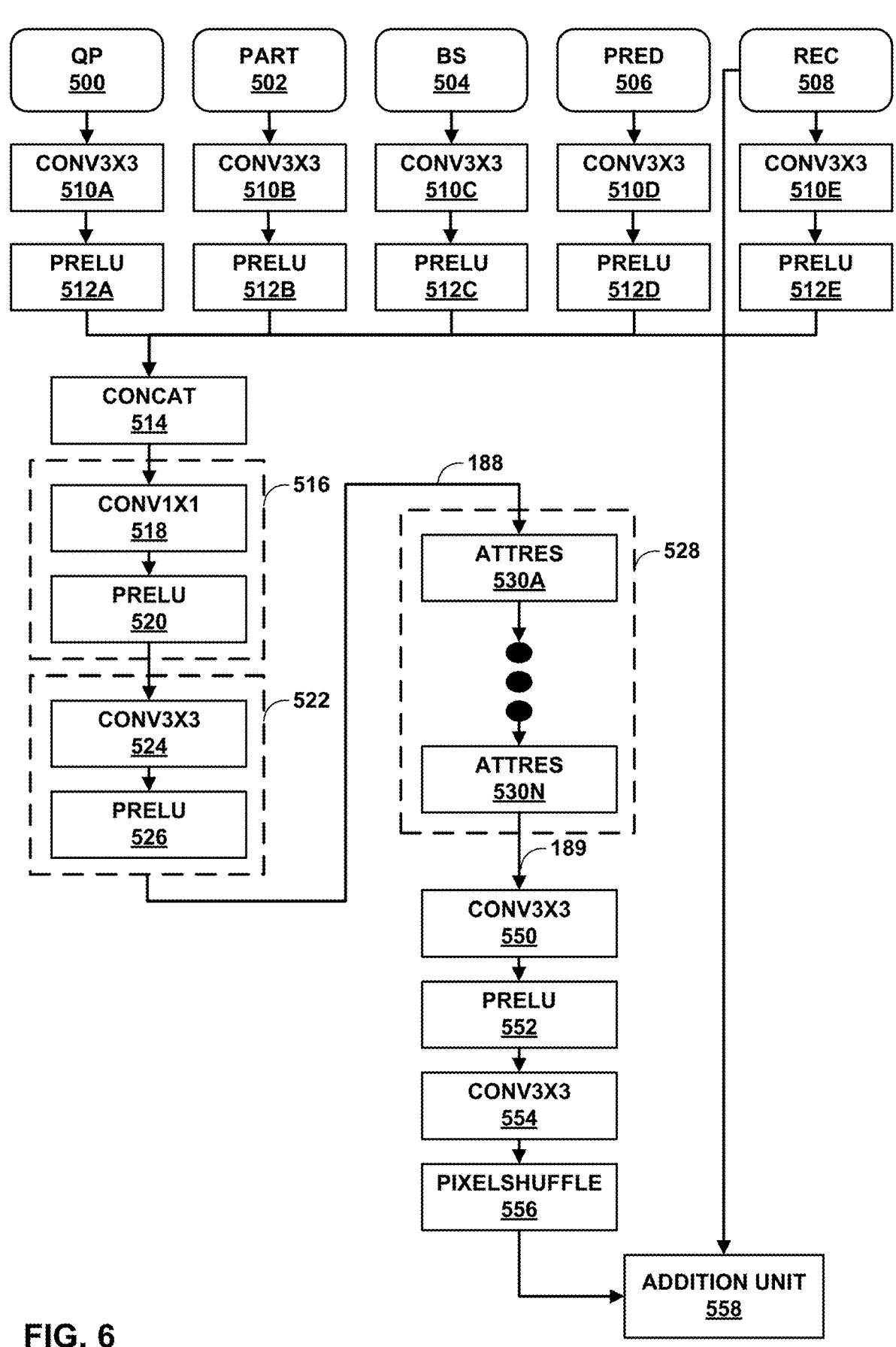
FIG. 6 is a block diagram illustrating another example CNN-based filter with padded input samples and supplementary data.

The structure of the network of JVET-Z0113 is shown in FIG. 6. In the first part (FIG. 6), the different input data types are convolved with number of kernels size of 3×3 (conv3×3) to produce feature maps, the convolved inputs undergo activation by parametric rectified linear units (PReLUs), and then the results for each data type are concatenated (concat), fused and subsampled once to create the output y. The number of feature maps used in JVET-Z0113 is 96. This output is then fed through N=8 attention residual blocks (AtttRes blocks), each one with the structure shown in FIG. 6. The output from the last attention residual block z is fed into the last part of the network.

For example, the NN-based filter of FIG. 6 includes a first portion including input 3×3 convolutions 510A-510E and respective parametric rectified linear units (PReLUs) 512A-512E for each of the inputs to generate feature maps (e.g., the feature extraction section of the NN-filter). Concatenation unit 514 concatenates the feature maps and provides them to fuse block 516 and transition block 522. While shown as fuse block 516 and transition block 522, in some examples, fuse block 516 and transition block 522 may together be referred to as a fusion block. The NN-based filter in FIG. 6 further includes a set 528 of attention residual (AttRes) blocks 530A-530N; and a last portion (e.g., the tail section) including 3×3 convolution 550, PReLU 552, 3×3 convolution 554, and pixel shuffle unit 556. The AttRes blocks may also be referred to as backbone blocks.

In the first portion (e.g., the feature extraction section), different inputs, including quantization parameter (QP) 500, partition information (part) 502, boundary strength (BS) 504, prediction samples (pred) 506, and reconstruction samples (rec) 508 are received. Respective 3×3 convolutions 510A-510E and PReLUs 512A-512E convolve and activate the respective inputs to produce feature maps. Concatenation unit 514 then concatenates the feature maps. Fuse block 516, including 1×1 convolution 518 and PReLU 520, fuses the concatenated feature maps. Transition block, including 3×3 convolution 524 and PReLU 526, subsamples the fused inputs to create output 188. Output 188 is then fed through set 528 of attention residual blocks 530A-530N, which may include a various number of attention residual blocks, e.g., 8. The attention block is explained further with respect to FIG. 7. Output 189 from the last of the set 528 of attention residual blocks 530 is fed to the last portion of the NN-based filter. In the last portion, which may be a tail block, 3×3 convolution 550, PReLU 552, 3×3 convolution 554, and pixel shuffle unit 556 processes output 189, and addition unit 558 combines this result with the original input reconstructions samples 508. This ultimately forms the filtered output for presentation and storage as reference for subsequent inter-prediction, e.g., in a decoded picture buffer (DPB). In some examples, the NN-based filter of FIG. 6 uses 96 feature maps.

Figure 7:
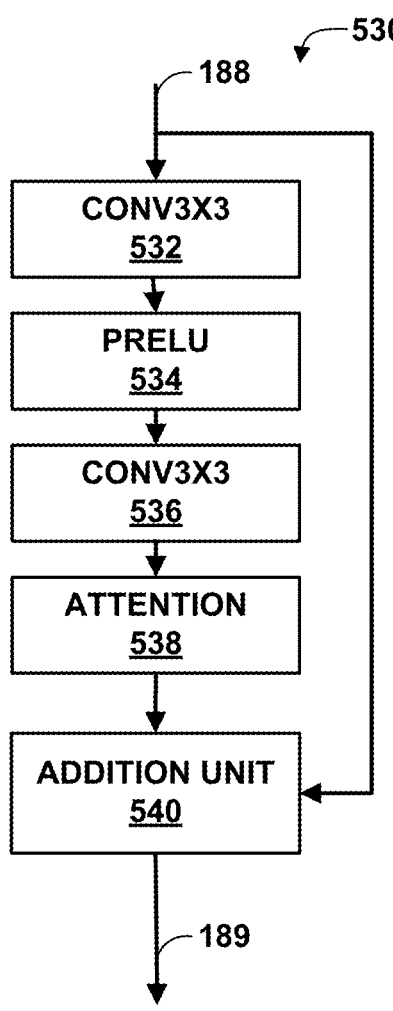
FIG. 7 is a conceptual diagram illustrating an attention residual block of FIG. 6.

FIG. 7 is a conceptual diagram illustrating an attention residual block of FIG. 6. That is, FIG. 7 depicts attention residual block 530, which may include components similar to those of attention residual blocks 530A-530N of FIG. 6. In this example, attention residual block 530 includes first 3×3 convolution 532, parametric rectified linear unit (PReLU) filter 534, second 3×3 convolution 536, an attention block 538, and addition unit 540. Addition unit 540 combines the output of attention block 538 and output 188, initially received by convolution 532, to generate output 189.

Figure 8:
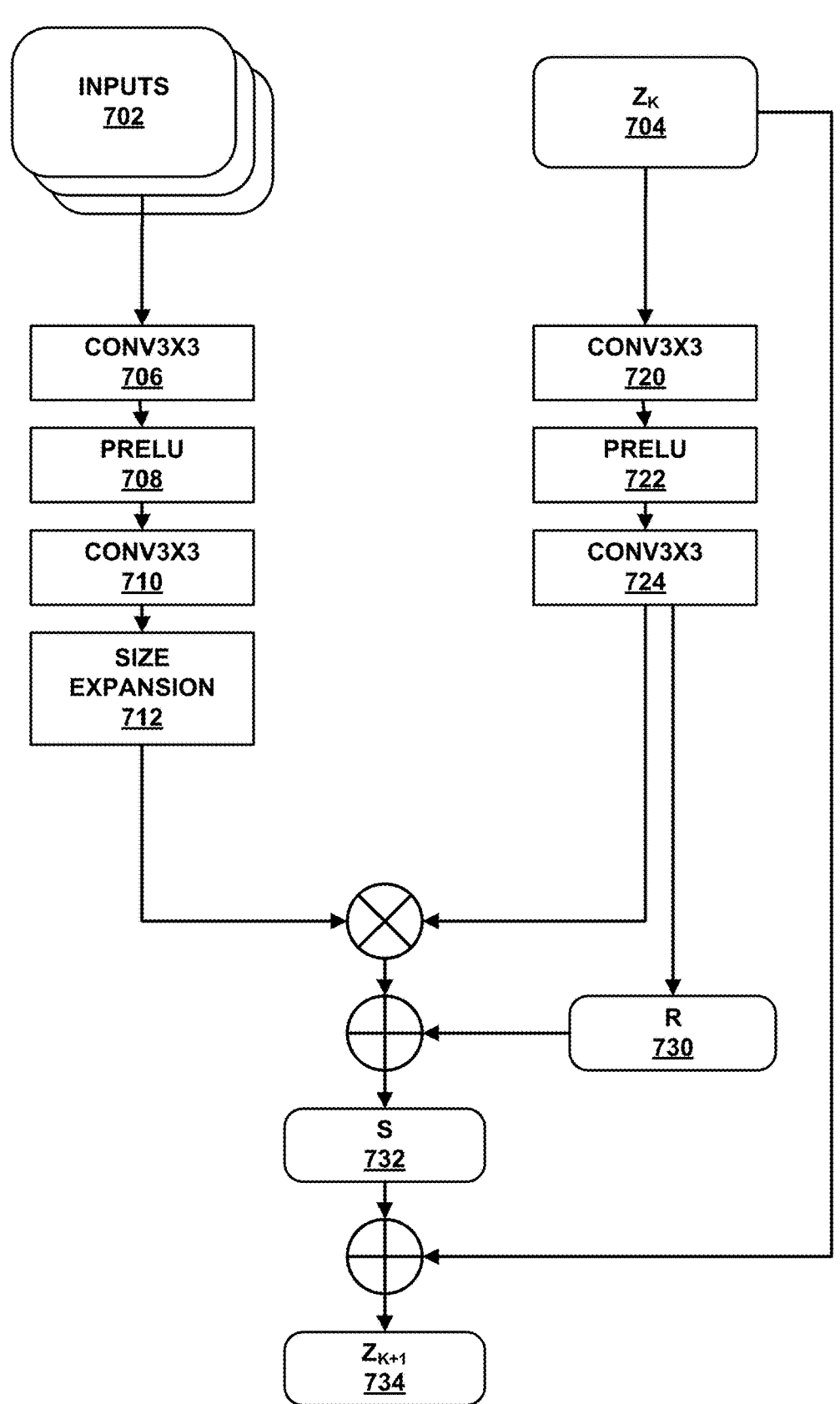
FIG. 8 is a block diagram illustrating another example CNN-based filter with padded input samples and supplementary data.

The spatial attention layer in AttRes block is also illustrated in FIG. 8. FIG. 8 is a conceptual diagram illustrating an example spatial attention layer of FIG. 7. As shown in FIG. 8, a spatial attention layer of attention residual block 530 includes 3×3 convolution 706, PReLU 708, 3×3 convolution 710, size expansion unit 712, 3×3 convolution 720, PReLU 722, and 3×3 convolution 724. 3×3 convolution 706 receives inputs 702, corresponding to quantization parameter (QP) 500, partition information (part) 502, boundary strength (BS) 504, prediction information (pred) 506, and reconstructed samples (rec) 508 of FIG. 6. 3×3 convolution 720 receives $Z_K$ 704. The outputs of size expansion unit 712 and 3×3 convolution 724 are combined, and then combined with R value 730 to generate S value 732. S value 732 is then combined with $Z_K$ value 704 to generate output $Z_{K+1}$ value 734.

Figure 9:
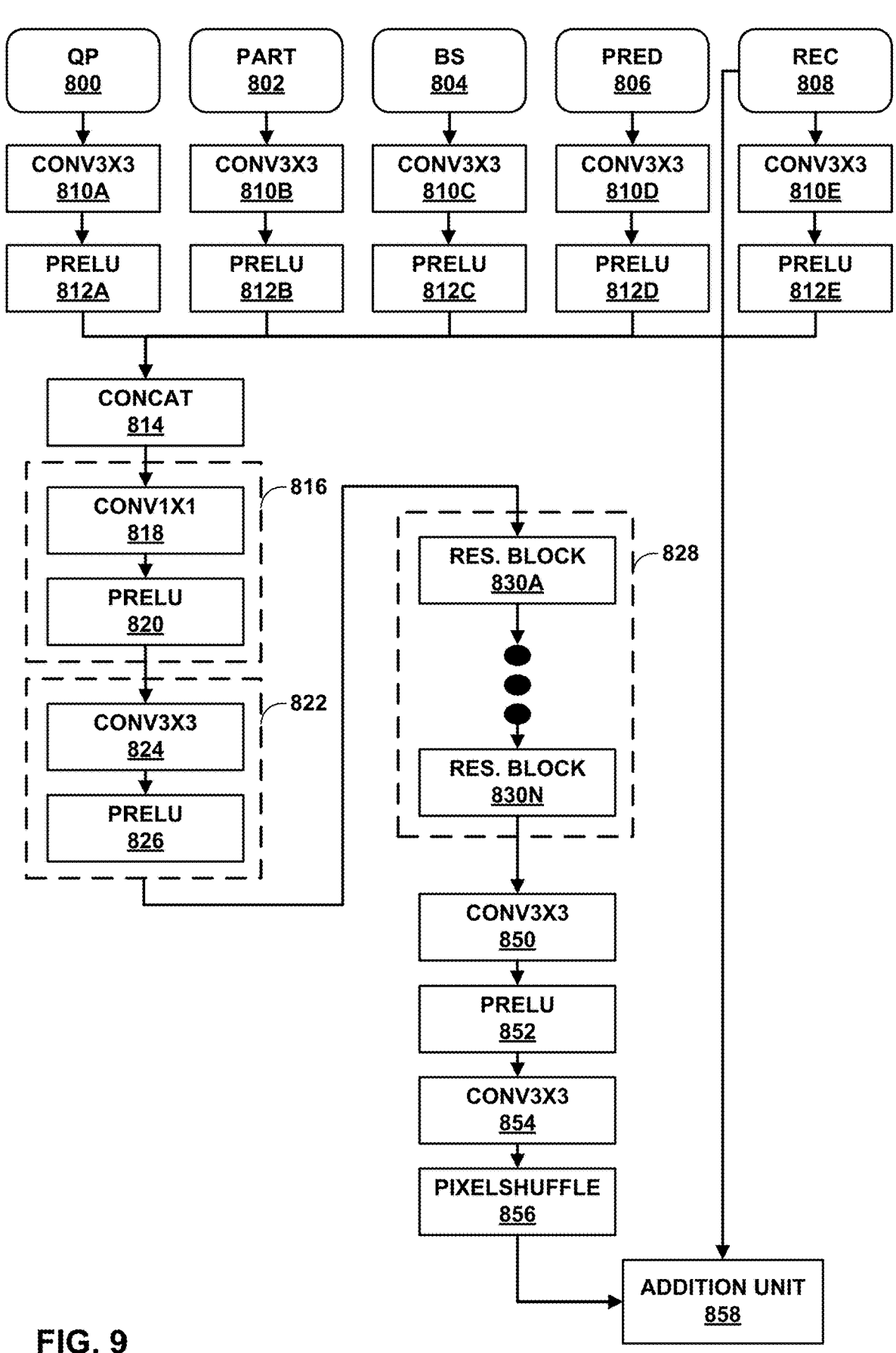
FIG. 9 is a block diagram illustrating an example of a simplified CNN-based filter architecture with padded input samples and supplementary data.
Figure 10:
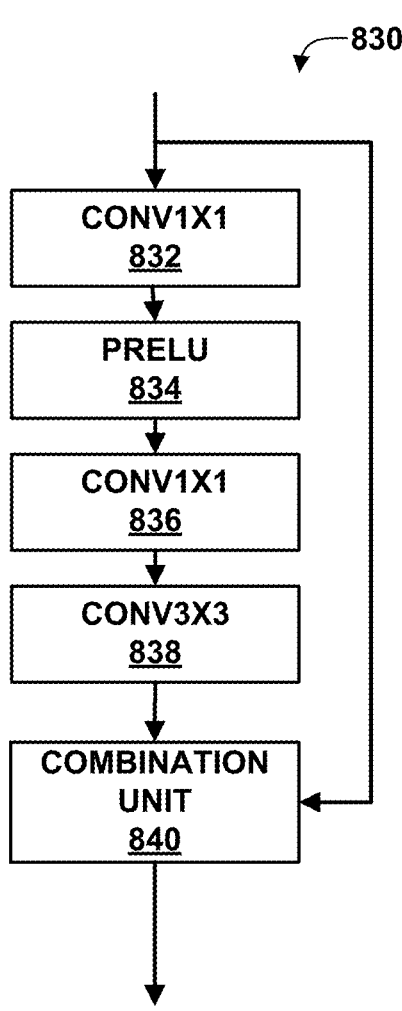
FIG. 10 is a conceptual diagram illustrating an example residual block structure of FIG. 9.

Another example NN architecture is a reduced complexity multi-mode CNN ILF. In JVET-AC0155, S. Eadie, M. Coban, M. Karczewicz, EE1-1.9: Reduced complexity CNN-based in-loop filtering, JVET-AC0155, January 2023, an alternative design of NN architecture was proposed. It was proposed to use larger number of low complexity residual blocks in the backbone of the JVET-Z0113 CNN filter along with reduced number of channels (feature maps) and removal of the attention modules. The proposed CNN filtering structure of JVET-AC0155 (for Luma filtering) is shown in FIG. 9. FIG. 9 shows the CNN Architecture of JVET-AC0155 for a residual (res) block. FIG. 10 shows the CNN Architecture of JVET-AC0155 for a filter block.

FIG. 9 is a block diagram illustrating an example of a simplified CNN-based filter architecture with padded input samples and supplementary data. The NN-based filter of FIG. 9 includes 3×3 convolutions 810A-810E and PReLUs 812A-812E, which convolve corresponding inputs, i.e., QP 800, Part 802, BS 804, Pred 806, and Rec 808 to generate feature maps (e.g. the feature extraction section). Concatenation unit 814 concatenates the convolved inputs (e.g., the feature maps). Fuse block 816 then fuses the concatenated feature maps using 1×1 convolution 818 and PReLU 820. Transition block 822 then processes the fused data using 3×3 convolution 824 and PReLU 826. While shown as fuse block 816 and transition block 822, in some examples, fuse block 816 and transition block 822 may together be referred to as a fusion block.

In this example, the NN-based filter includes a set 828 of residual blocks 830A-830N (also called backbone blocks), each of which may be structured according to residual block structure 830 of FIG. 10, as discussed below. Residual blocks 830A-830N may replace AttRes blocks 530A-530N of FIG. 6. The example of FIG. 9 may be used for luminance (luma) filtering, although as discussed below, similar modifications may be made for chrominance (chroma) filtering.

The number of residual blocks and channels included in set 828 of FIG. 9 can be configured differently. That is, N may be set to a different value, and the number of channels in residual block structure 830 may be set to a number different than 160, to achieve different performance-complexity tradeoffs. Chroma filtering may be performed with these modifications for processing of chroma channels.

Set 828 of residual blocks 830A-830N has N instances of residual block structure 830. In one example, N may be equal to 32, such that there are 32 residual block structures. Residual blocks 830A-830N may use 64 feature maps, which is reduced relative to the 96 feature maps used in the example of FIG. 6.

In the last portion of FIG. 9, 3×3 convolution 850, PReLU 852, 3×3 convolution 854, and pixel shuffle unit 856 processes output of set 828, and addition unit 858 combines this result with the original input reconstructions samples (REC) 808. This ultimately forms the filtered output for presentation and storage as reference for subsequent inter-prediction, e.g., in a decoded picture buffer (DPB).

Number of residual blocks used is M=24. The number of features maps (convolutions) is reduced to 64. In the Res-Blocks (e.g., residual blocks 830A-830N), the number of channels firstly goes up to 160 before the activation layer, and then goes down to 64 after the activation layer. The number of residual blocks and channels can be configured differently (M set to another value and the number of channels in the residual block can be set to a number different than 160) for different performance-complexity trade-offs. Chroma filtering follows the concept in JVET-Z0113 (e.g., of FIG. 6) with the above modifications to its backbone for processing of chroma channels.

FIG. 10 is a conceptual diagram illustrating an example residual block structure 830 of FIG. 9. In this example, residual block structure 830 includes first 1×1 convolution 832, which may increase a number of input channels to 160, before an activation layer (PReLU 834) processes the input channels. PReLU 834 may thereby reduce the number of channels to 64 through this processing. Second 1×1 convolution 836 then processes the reduced channels, followed by 3×3 convolution 838. Finally, combination unit 840 may combine the output of 3×3 convolution 838 with the original input received by residual block structure 830.

Figure 11:
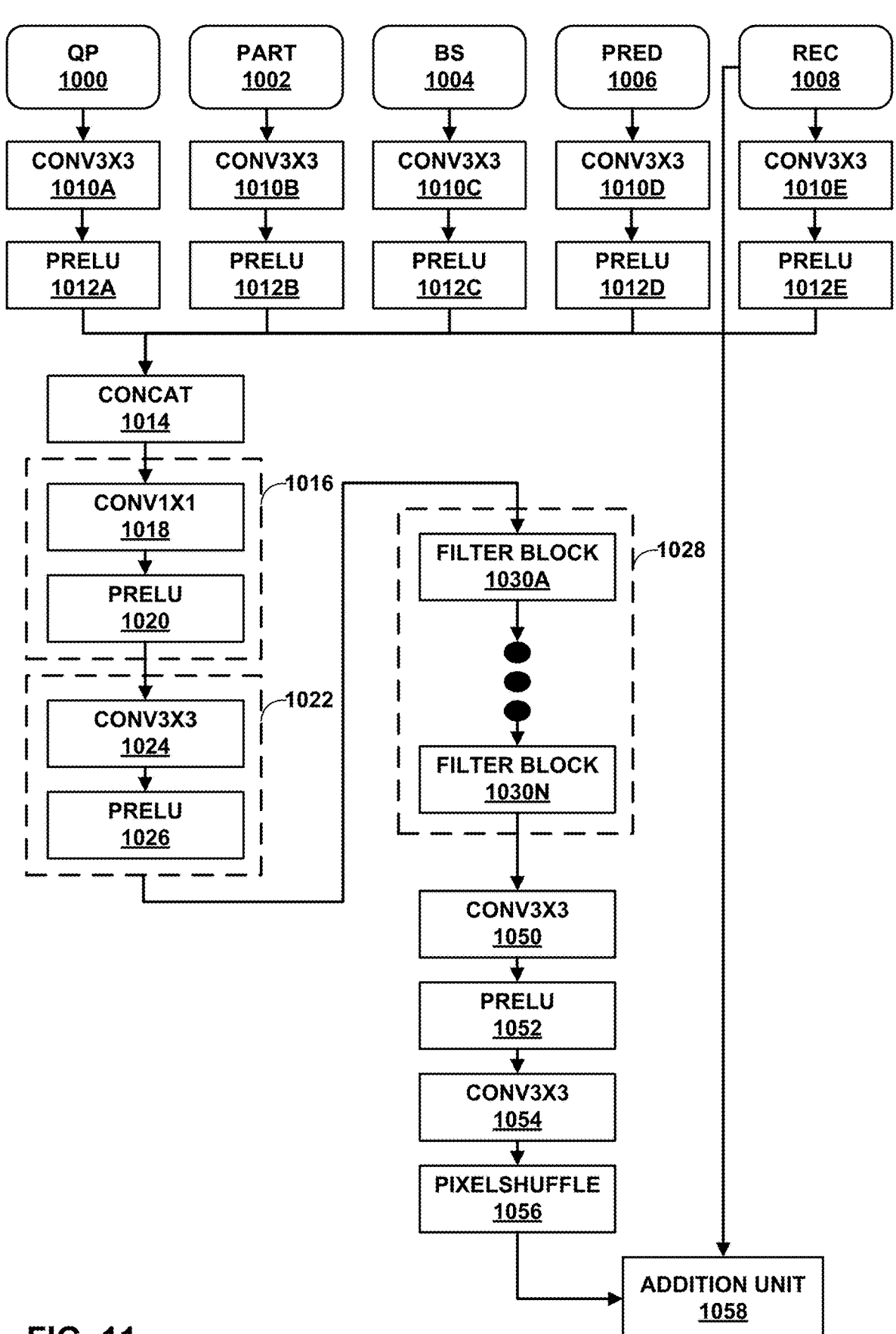
FIG. 11 is a block diagram illustrating another example of a simplified CNN-based filter architecture with padded input samples and supplementary data.

In further modification, the bypass branch around convolution and activation layers in the residual block in the previous solution is removed, as shown in FIG. 11. The number of channels and number of filter blocks can be configurable, for example, 64 channels, 24 filter blocks, with 160 channels before and after the activation, which results in the complexity of the network is 605.93kMAC and the number of parameters is 1.5M for the intra luma model.

Another example NN architecture is a multi-mode CNN ILF with separable convolution. Further complexity reduction of CCN ILF architecture is achieved with utilization of the separable convolution in place of 2D convolutions (3×3). In JVET-AD0023, EE1 test 1.3.5, a low-rank convolution approximation decomposes a 3×3×M×N convolution into a pixel-wise convolution (1×1×M×R), two separable convolutions (3×1×R×R, 1×3×R×R) and another pixel-wise convolution (1×1×R×N) was applied to the residual block of the architecture described in JVET-AC0155. In JVET-AC0155, R is the rank of the approximation, and can ablate the performance/complexity of the approximation.

FIG. 11 is a conceptual diagram illustrating another example filtering block structure that may be substituted for the set of attention residual blocks of FIG. 6 according to the techniques of this disclosure. The NN-based filter of FIG. 11 includes 3×3 convolutions 1010A-1010E and PReLUs 1012A-1012E, which convolve respective inputs, i.e., QP 1000, Part 1002, BS 1004, Pred 1006, and Rec 1008 to form feature maps (e.g., the feature extraction section). Concatenation unit 1014 concatenates the feature maps. Fuse block 1016 then fuses the concatenated inputs using 1×1 convolution 1018 and PReLU 1020. Transition block 1022 then processes the fused data using 3×3 convolution 1024 and PReLU 1026. While shown as fuse block 1016 and transition block 1022, in some examples, fuse block 1016 and transition block 1022 may together be referred to as a fusion block.

In this example, the NN-based filtering unit includes a set 1028 of N filter blocks 1030A-1030N (also called backbone blocks), each of which may have the structure of filter block 1030 of FIG. 12 as discussed below. Filter block structure 1030 may be substantially similar to residual block structure 830, except that combination unit 840 is omitted from filter block structure 1030, such that input is not combined with output. Instead, output of each residual block structure may be fed directly to the subsequent block.

In the last portion of FIG. 11, 3×3 convolution 1050, PReLU 1052, 3×3 convolution 1054, and pixel shuffle unit 1056 processes output of set 1028, and addition unit 1058 combines this result with the original input reconstructions samples (REC) 1008. This ultimately forms the filtered output for presentation and storage as reference for subsequent inter-prediction, e.g., in a decoded picture buffer (DPB).

In one example, the architecture of FIG. 11, is implemented with parameters K=64, M=160 and R=51, and total number of 24 residual blocks results in the complexity of the network is 356.43kMAC and the number of parameters is 1.07M for the intra luma model.

Figure 12:
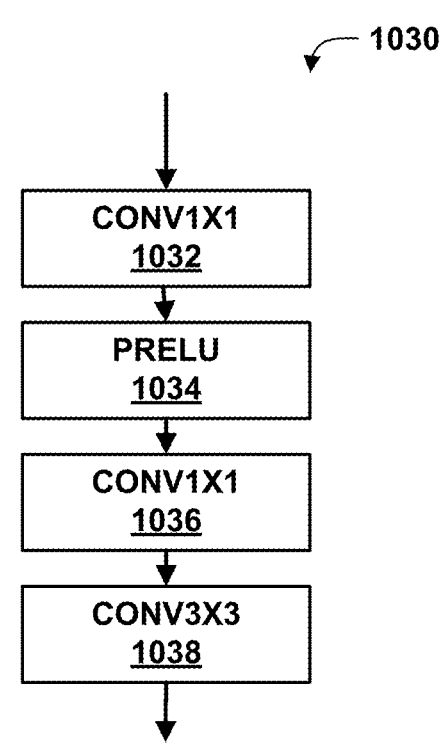
FIG. 12 is a conceptual diagram illustrating an example filter block structure of FIG. 11.

FIG. 12 is a conceptual diagram illustrating an example filter block structure 1030 of FIG. 11. In this example, filter block structure 1030 includes first 1×1 convolution 1032, which may increase a number of input channels to 160, before an activation layer (PReLU 1034) processes the input channels. PReLU 1034 may thereby reduce the number of channels to 64 through this processing. Second 1×1 convolution 1036 then processes the reduced channels, followed by 3×3 convolution 1038. As discussed above, filter block structure 1030 does not include a combination unit, in contrast with the residual block structure 830 of FIG. 10.

In some examples, the architecture of FIG. 11, with decomposition illustrated in FIG. 12, is implemented with parameters K=64, M=160 and R=51, and total number of 24 residual blocks results in the complexity of the network is 356.43kMAC and the number of parameters is 1.07M for the intra luma model. FIG. 12 shows an illustration of the CNN Architecture of JVET-AC0155.

Figure 13:
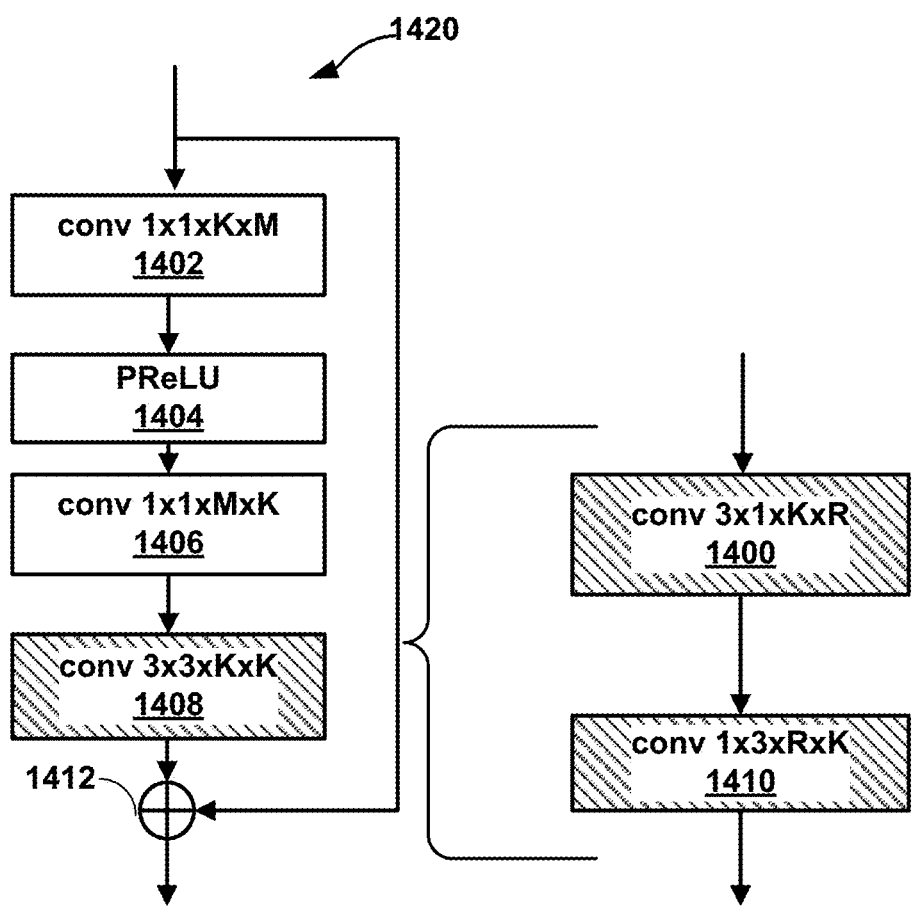
FIG. 13 is a block diagram illustrating an example CNN decomposition architecture.

FIG. 13 is a block diagram illustrating an example multiscale feature extraction backbone network with two-component convolution. The example of FIG. 13 may use of an approximation of a 3×3×K×K convolution with a 3×1×K×R convolution and a 1×3×R×K convolution.

In the example of FIG. 13, residual block 1420 includes a 1×1×K×M convolution 1402, followed by PReLU 1404. The output of PReLU 1404 is input to 1×1×M×K convolution 1406. A 3×3×K×K convolution 1408 of residual block 1420 is approximated by a 3×1×K×R convolution 1400 and then a 1×3×R×K convolution 1410. The output of 1×3×R×K convolution 1410 may be input to combination unit 1412 which may combine the output of 1×3×R×K convolution 1410 with an input to 1×1×K×M convolution 1402. R is the canonical rank of the decomposition. A lower rank implies a larger complexity reduction.

Figure 15:
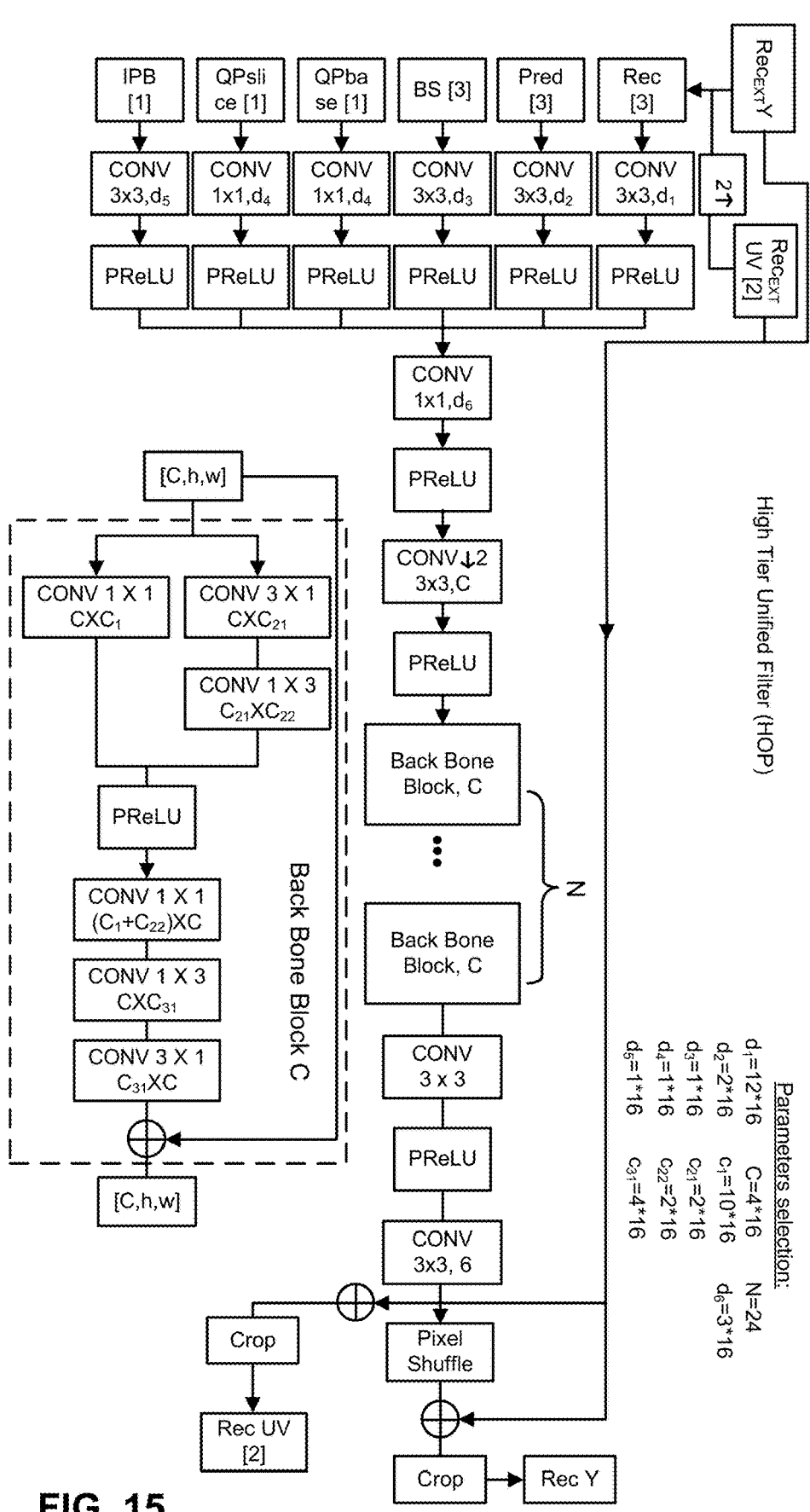
FIG. 15 show an example of a unified filter.

Another example NN architecture is a multi-mode CNN ILF with two-component decomposition for multiscale feature extraction. A multiscale feature extraction with a two-component convolution network is proposed in JVET-AD021, which is illustrated in FIG. 15, the 3×3 convolutions are decomposed into a 3×1×C1×R convolution and followed by a 1×3×R×C2 convolution, where C1 and C2 are the number of input and output channels, respectively, and R is the rank of the approximation. The parameter R can be made proportional to R=C1×C2/(C1+C2) and controls the complexity of the approximation.

Figure 14:
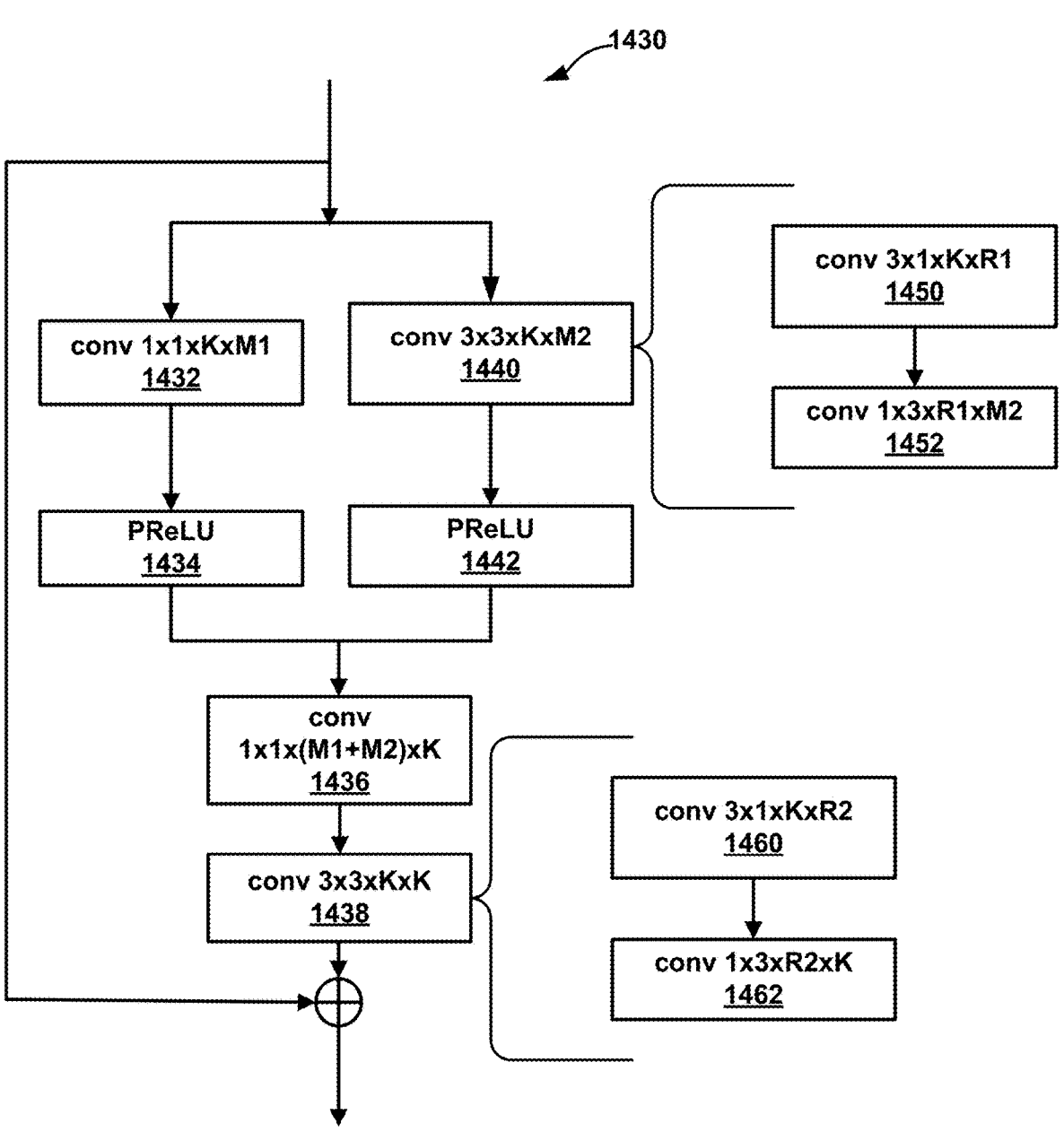
FIG. 14 is a block diagram illustrating an example multiscale feature extraction backbone network with two-component convolution.

As an example, the architecture illustrated in FIG. 14 may be implemented with parameters R1=8, R2=44, M1=160 and M2=16, and total number of 24 residual blocks, the complexity of the network will be 358.43kMAC and the number of parameters is 1.07M for the intra luma model. FIG. 14 shows an example of a multiscale feature extraction backbone network with the two-component convolution.

Figure 16:
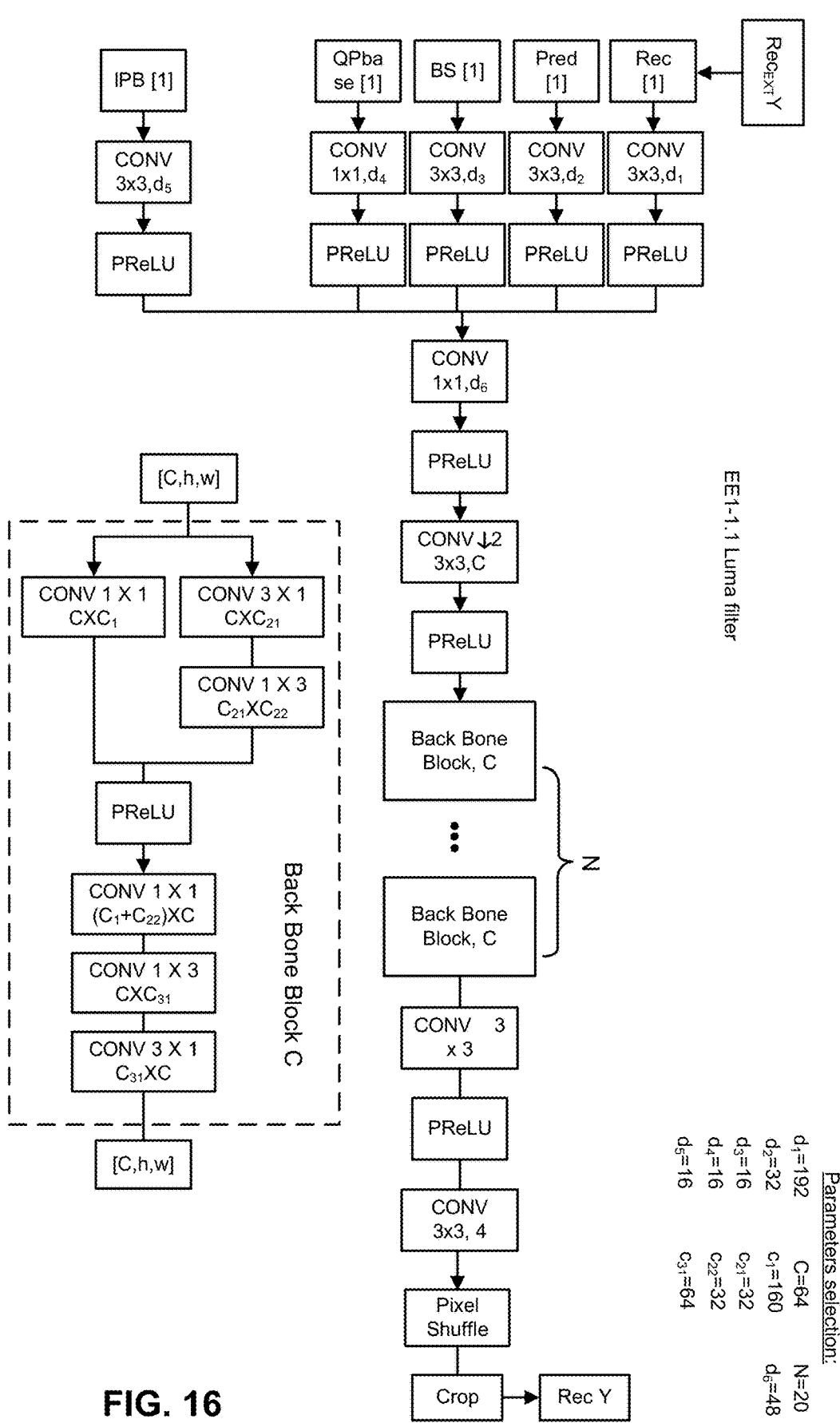
FIG. 16 shows an example of a separate model for luma.
Figure 17:
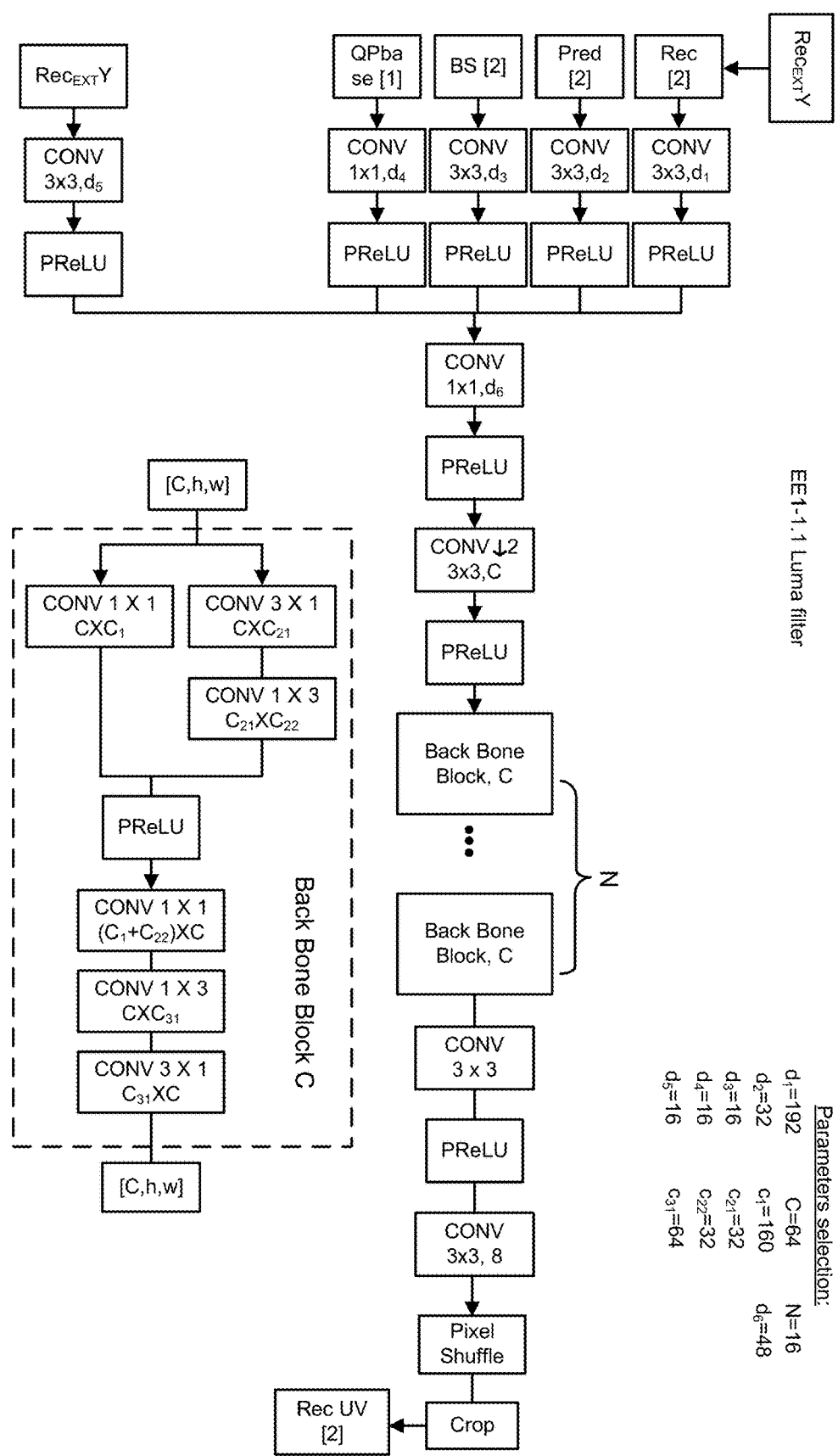
FIG. 17 shows an example of a separate model for chroma.

Another example NN architecture is a unified CNN ILF with the two-component decomposition. The multiscale feature extraction backbone with the two-component decomposition has been integrated into the unified model in EE. In addition, the specification from the EE contains two versions of the model, which are (1) a unified model for joined luma and chroma, see FIG. 15, and (2) separate models for luma and chroma, respectively, see FIGS. 16 and 17.

Figure 18:
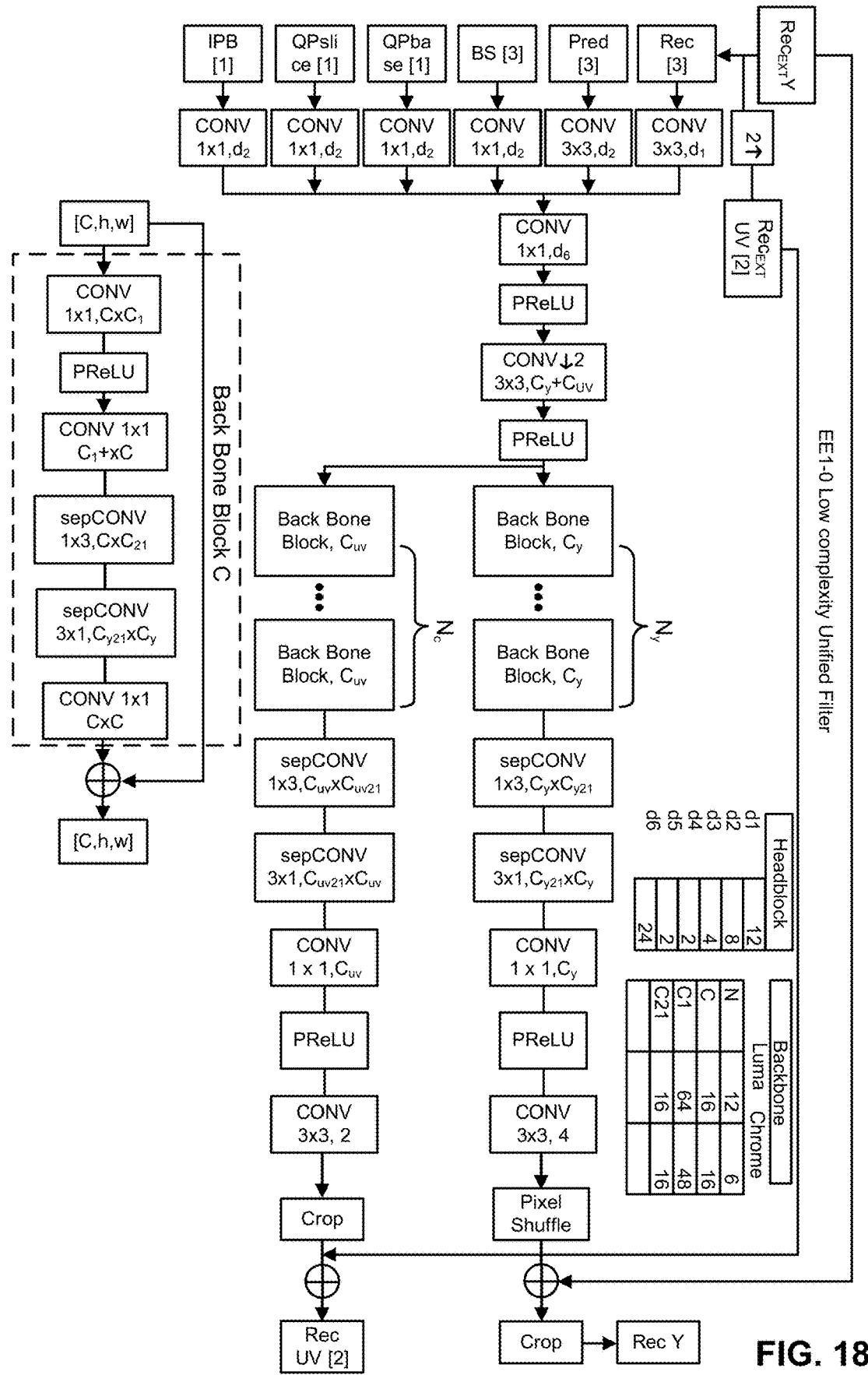
FIG. 18 shows another example of a unified filter with luma and chroma split.

Video encoder 200 and video decoder 300 may be configured to utilize a unified CNN ILF with luma/chroma split. A CCN ILF filter architecture with luma/chroma split was proposed in JVET-AE0281. Separate processing branches for luma and chroma allow independent training of the NN weights to target components and a degree of complexity-performance tradeoff optimization. In the filter architecture shown in FIG. 18, a chroma branch can employ a smaller number of the BB (back bones), e.g. $N_c<N_y$, or reduced number of channels, e.g. $C_{uv}<Cy$ or $C_{uv21}<C_{y21}$. In addition, a skip connection is depicted in the backbone block in FIG. 18 (e.g., from RecExtY and RecExtUV), and this forms a residue block of the ResNet. In some examples, all the backbone block can be with or without the skip connection.

The following describes unified CNN ILF with switchable decomposition order. Certain methods of separable convolution described above with respect to the multi-mode CNN ILF with two-component decomposition and utilized in ResNet Filter Architecture described in FIG. 15 can employ reduced decomposition ranking, thus reducing number of channels in the intermediate stage of separable decomposition.

In such filter configurations, the first stage of the decomposition, e.g. applied in a horizontal direction 3×1×C1×R, reduces the number of output features, if R<C1. In the second stage, with application of convolution in vertical directions, 1×3×R×C2, the number of features is increased, if R<C2. This may lead to certain prioritization of the features in vertical direction. This might lead to a nonoptimal filtering/feature extraction due to the bottleneck introduced by using the fixed directional kernels.

In order to address the aforementioned problem, certain architecture may flip (switch the order) the directions of the decomposed kernels in the sequence of the applied blocks. The examples described below are proposed based on the UF architecture and address decompositions in the residue blocks. Switching order decomposition can be utilized in other blocks of the CNN filters, e.g. in the headblock or tail block, if such blocks employ decomposition of the multidimensional convolutions.

Figure 19:
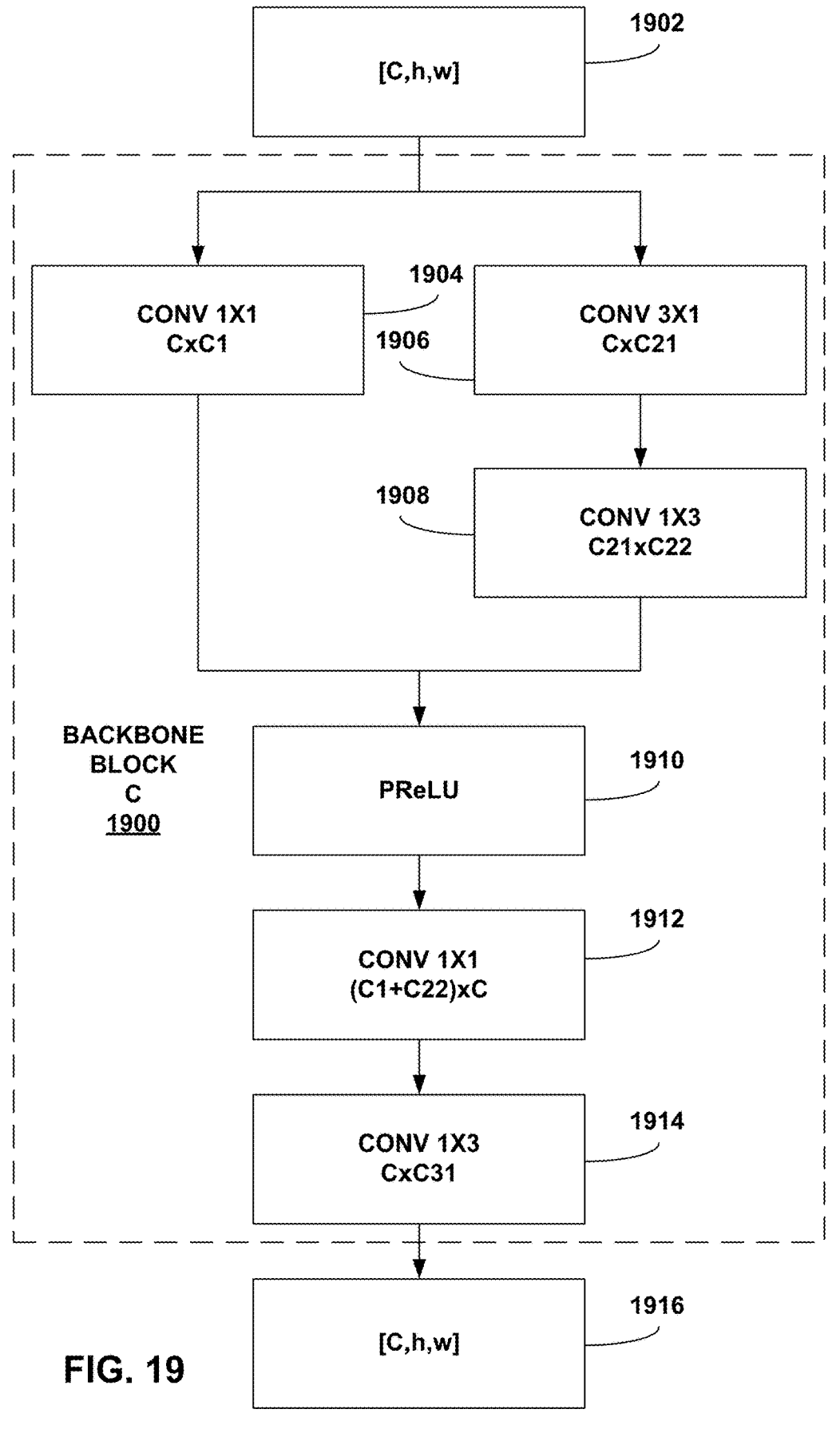
FIGS. 19-22 show examples of backbone residual blocks.

An example of backbone residue blocks with different kernel directions are shown in FIGS. 19-22, respectively. FIG. 19 illustrates backbone residue block, type 1. In FIG. 19, the input to backbone block 1900 is input 1902, which includes a channel (c), height (h), and width (w) of a block. Convolution unit 1904 performs convolution on input 1902 by applying a 1×1 convolution with parameters C and C1. Convolution unit 1906 performs convolution on input 1902 by applying a 3×1 convolution with parameters C and C21. Convolution unit 1908 performs convolution on the output of convolution unit 1906 by applying a 1×3 convolution with parameters C21 and C22.

Parametric Rectified Linear Unit (PReLU) unit 1910 performs an activation function on the outputs of convolution unit 1904 and convolution unit 1908. Convolution unit 1912 performs convolution on the output of PReLU unit 1910 by applying a 1×1 convolution with parameters C1, C22, and C. Convolution unit 1914 performs convolution on the output of convolution unit 1912 by applying a 1×3 convolution with parameters C and C31, and outputs output 1916 as an output for another layer.

Figure 20:
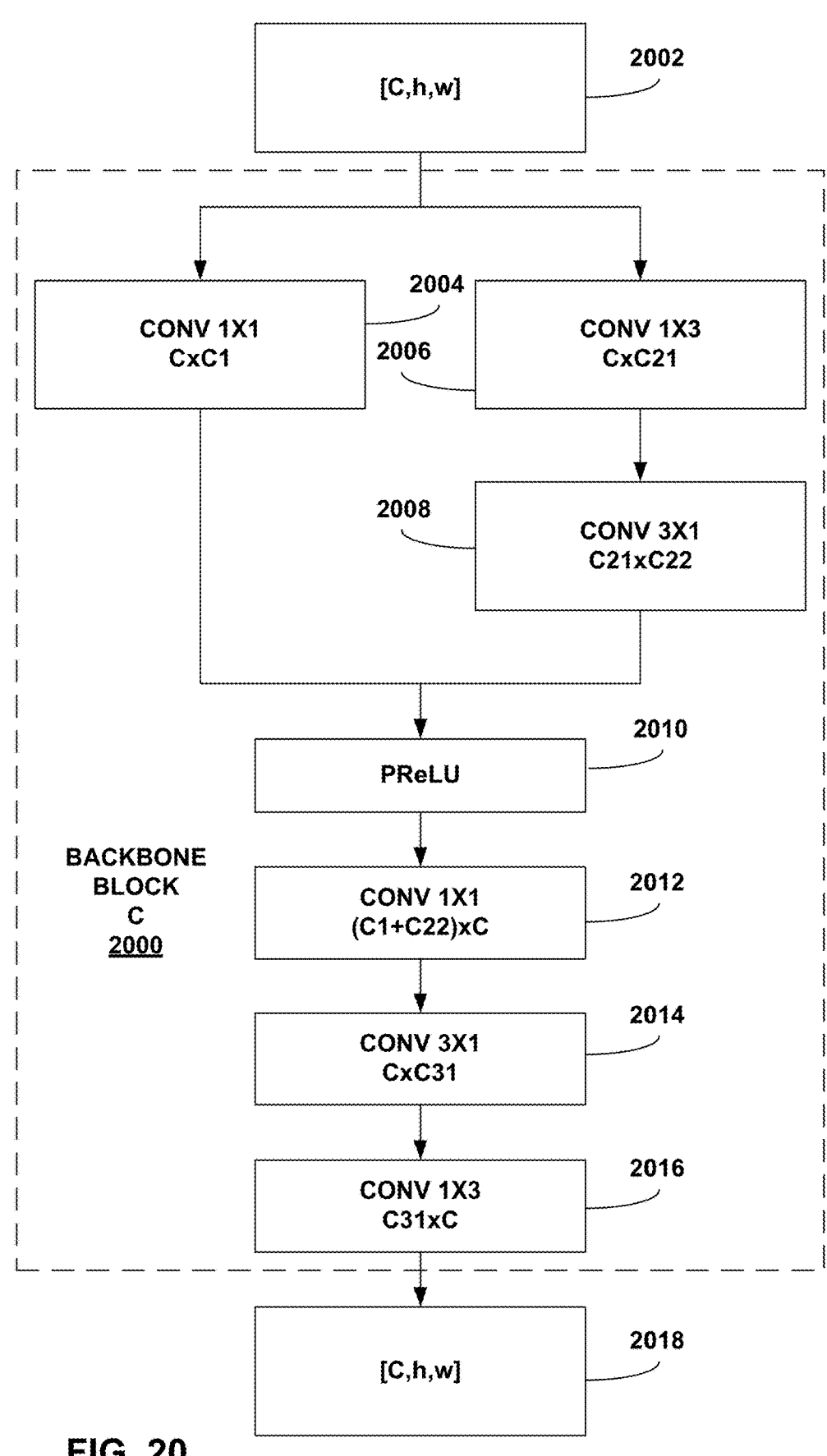

FIG. 20 illustrates backbone residue block, type 2. In FIG. 20, the input to backbone block 2000 is input 2002, which includes a channel (c), height (h), and width (w) of a block.

Convolution unit 2004 performs convolution on input 2002 by applying a 1×1 convolution with parameters C and C1. Convolution unit 2006 performs convolution on input 2002 by applying a 1×3 convolution with parameters C and C21. Convolution unit 2008 performs convolution on the output of convolution unit 2006 by applying a 3×1 convolution with parameters C21 and C22.

PReLU unit 2010 performs an activation function on the outputs of convolution unit 2004 and convolution unit 2008. Convolution unit 2012 performs convolution on the output of PReLU unit 2010 by applying a 1×1 convolution with parameters C1, C22, and C. Convolution unit 2014 performs convolution on the output of convolution unit 2012 by applying a 3×1 convolution with parameters C and C31. Convolution unit 2016 performs convolution on the output of convolution unit 2014, by applying a 1×3 convolution with parameters C31 and C and outputs output 2018 as an output for another layer.

Figure 21:
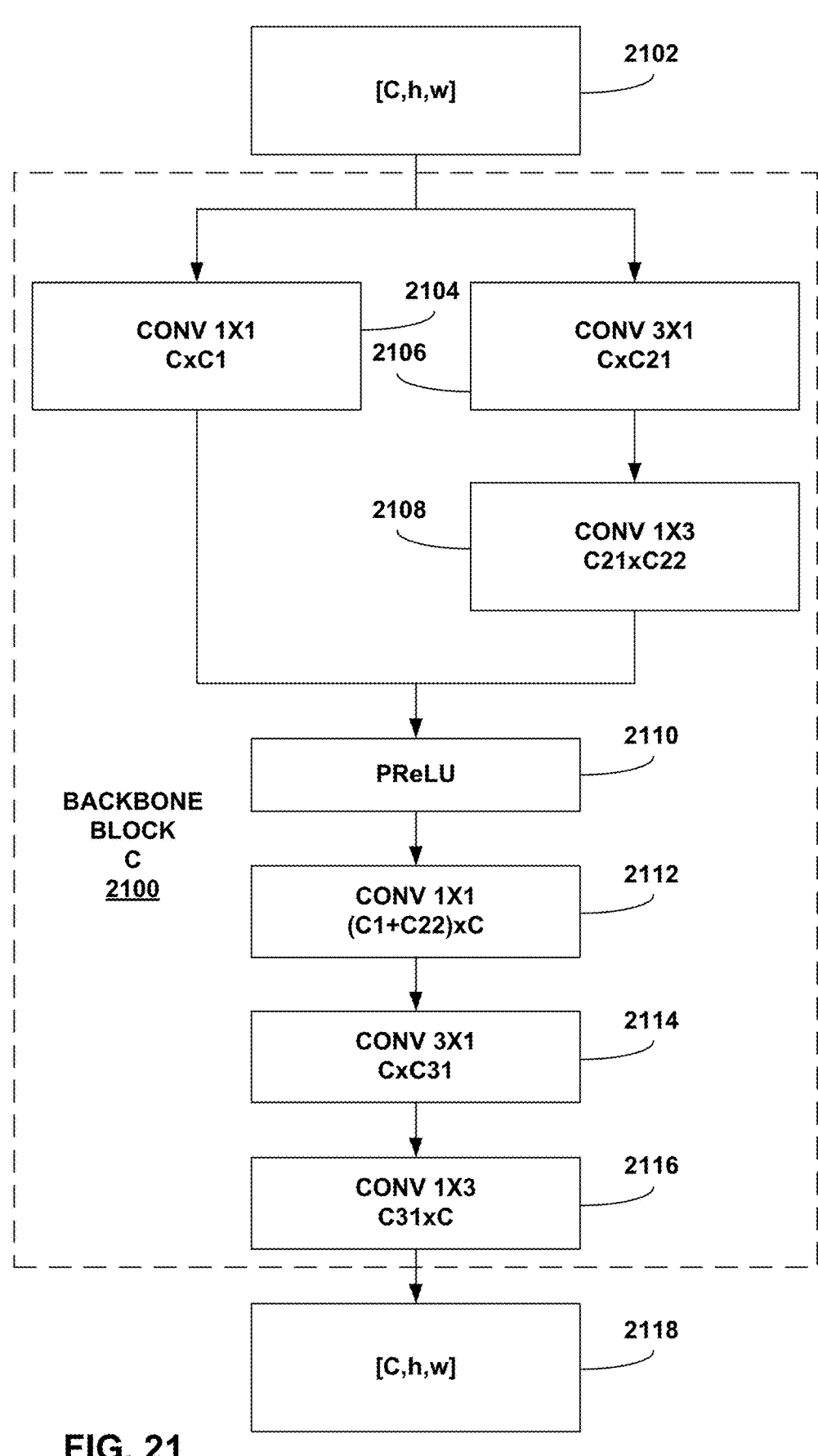

FIG. 21 illustrates backbone residue block, type 3. In FIG. 21, the input to backbone block 2100 is input 2102, which includes a channel (c), height (h), and width (w) of a block. Convolution unit 2104 performs convolution on input 2102 by applying a 1×1 convolution with parameters C and C1. Convolution unit 2106 performs convolution on input 2102 by applying a 3×1 convolution with parameters C and C21. Convolution unit 2108 performs convolution on the output of convolution unit 2106 by applying a 1×3 convolution with parameters C21 and C22.

PReLU unit 2110 performs an activation function on the outputs of convolution unit 2104 and convolution unit 2108. Convolution unit 2112 performs convolution on the output of PReLU unit 2110 by applying a 1×1 convolution with parameters C1, C22, and C. Convolution unit 2114 performs convolution on the output of convolution unit 2112 by applying a 3×1 convolution with parameters C and C31. Convolution unit 2116 performs convolution on the output of convolution unit 2114 by applying a 1×3 convolution with parameters C31 and C, and outputs output 2118 as an output for another layer.

Figure 22:
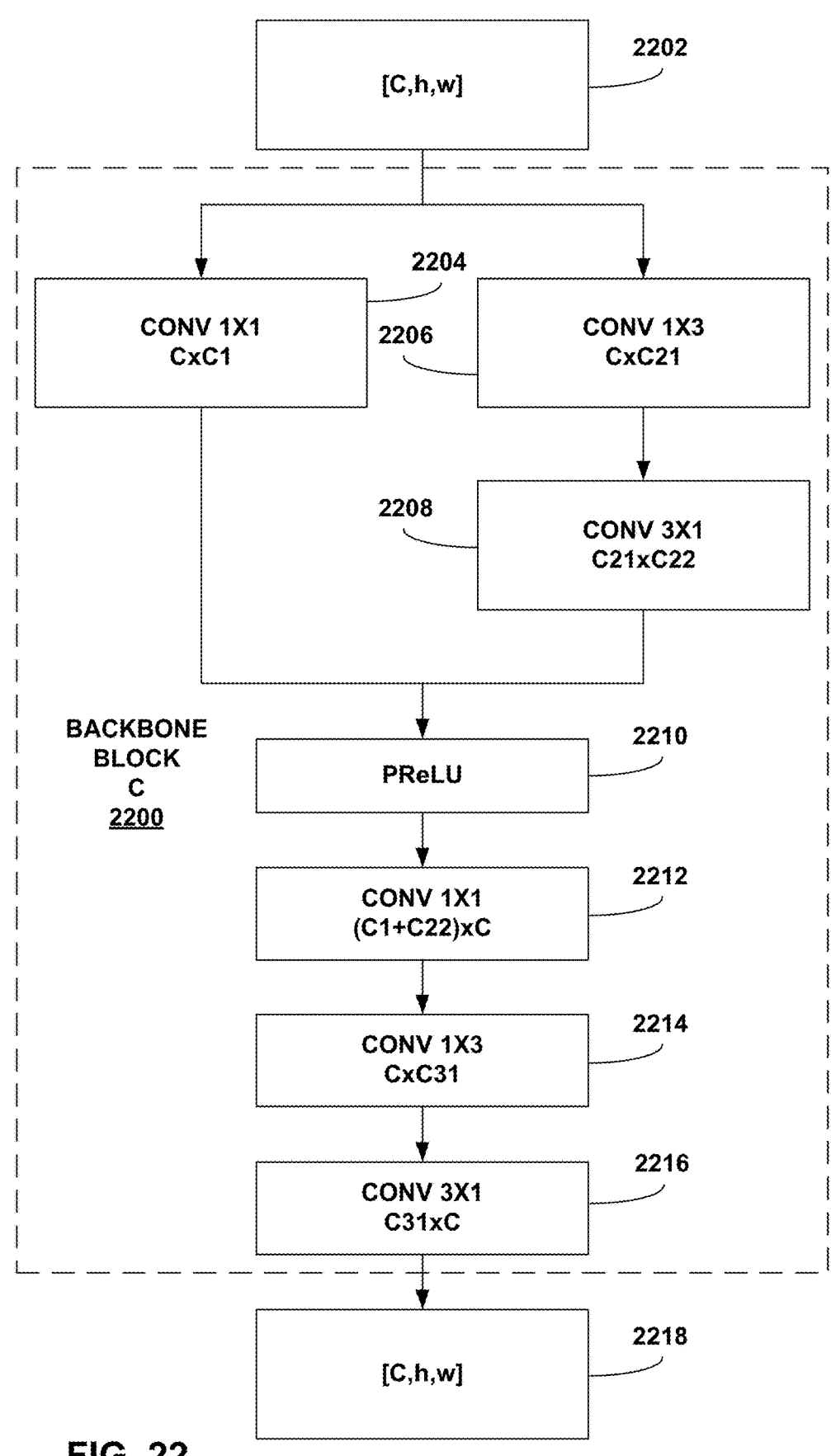

FIG. 22 illustrates backbone residue block type 4. In FIG. 22, the input to backbone block 2200 is input 2202, which includes a channel (c), height (h), and width (w) of a block. Convolution unit 2204 performs convolution on input 2202 by applying a 1×1 convolution with parameters C and C1. Convolution unit 2206 performs convolution on input 2202 by applying a 1×3 convolution with parameters C and C21. Convolution unit 2208 performs convolution on the output of convolution unit 2206 by applying a 3×1 convolution with parameters C21 and C22.

PReLU unit 2210 performs an activation function on the outputs of convolution unit 2204 and convolution unit 2208. Convolution unit 2212 performs convolution on the output of PReLU unit 2210 by applying a 1×1 convolution with parameters C1, C22, and C. Convolution unit 2214 performs convolution on the output of convolution unit 2212 by applying a 1×3 convolution with parameters C and C31. Convolution unit 2216 performs convolution on the output of convolution unit 2214 by applying a 3×1 convolution with parameters C31 and C, and outputs output 2218 as an output for another layer.

Figure 23:
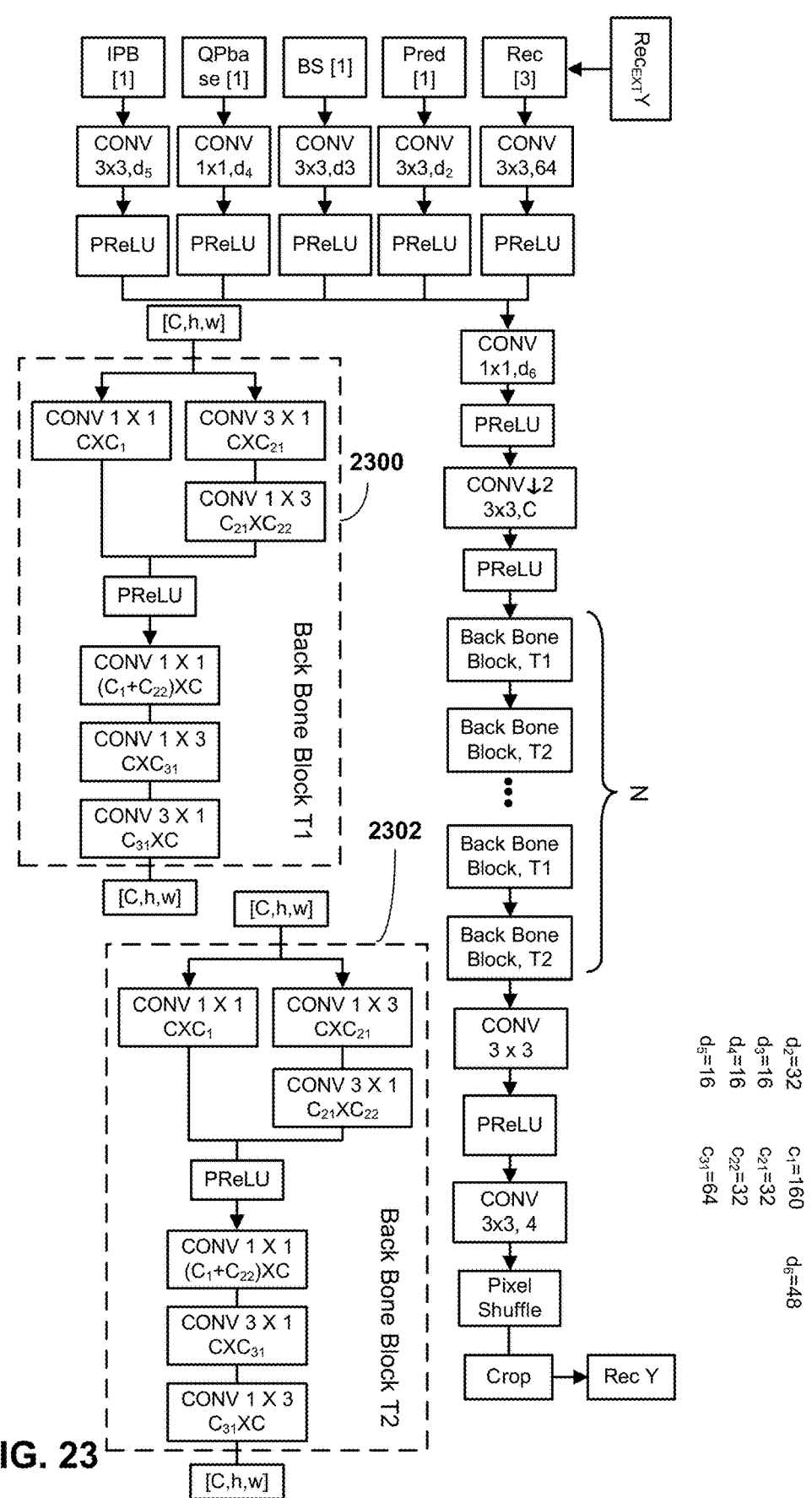
FIG. 23 shows another example a unified filter.

In some examples, it may be possible to alternate or mix backbone network 1 and 2 (e.g., type 1 of FIG. 19 and type 2 of FIG. 20) in a sequence for feature extraction. In another example, network 3 and 4 (e.g., type 3 of FIG. 21 and type 4 of FIG. 22) can be alternated and mixed in a sequence. In another example, network 1, 2, 3, and 4 can be mixed alternatively. For example, FIG. 23 illustrates an example of a proposed switched order decompositions (Type 1 and Type 2) integrated into a unified filter architecture (luma filtering). For example, FIG. 23 illustrates backbone block T1 2300 and backbone block T2 2302 in which the order decompositions are switched.

There may be certain issues with NN-based techniques. The backbone of the filter architecture described above for the unified CNN ILF with two-component decomposition is based on ResNet concept and employs relatively large number of sequential backbone blocks (BB). BB include cascaded convolutions with support up-to 3×3, interleaved with non-linear operations of Activation, e.g. ReLU, PreLU. In such architecture, the convolutional filters can efficiently capture local correlations and apply local attentions within an image block.

Despite various uses, ResNets, built from two-dimensional convolutions, may suffer from the following: (1) The convolution has a limited receptive field, preventing the modelling of long-range dependencies, and (2) The convolutions have static weights at inference and cannot adapt to the input content.

To improve performance of ResNet based filters (e.g., by employing non-local information in the training process), the example techniques may include a transformer block associated with each Backbone block (e.g., in each Backbone block or coupled to a Backbone block). Example of such architecture is shown in FIG. 24, where Residue Block of the backbone architecture are being improved by cascading with Transformer block, as illustrated.

Figure 24:
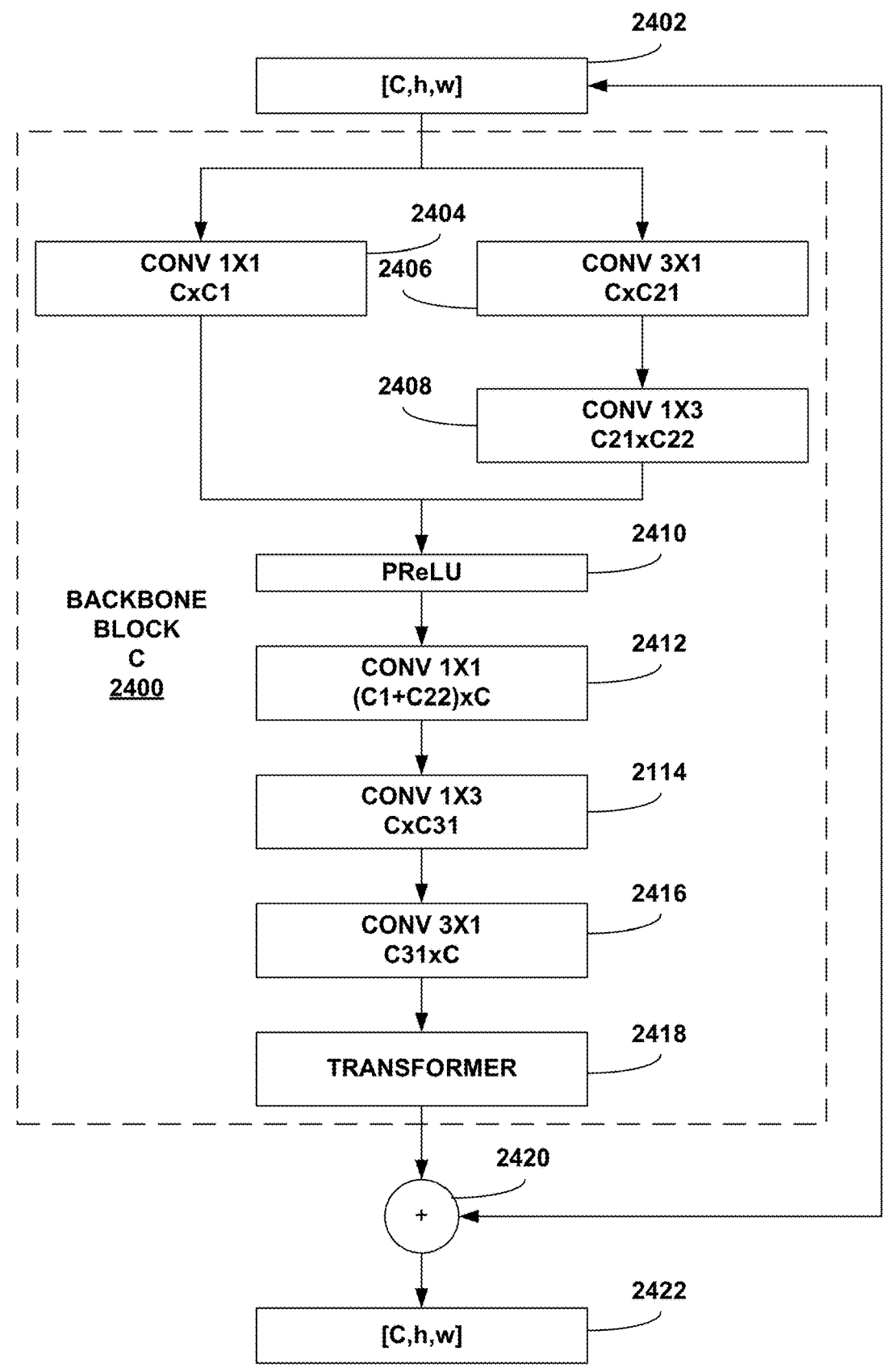
FIG. 24 is a block diagram illustrating an example of a backbone residue block with transformer block.

In FIG. 24, the input to backbone block 2400 is input 2402, which includes a channel (c), height (h), and width (w) of a block. Convolution unit 2404 performs convolution on input 2402 by applying a 1×1 convolution with parameters C and C1. Convolution unit 2406 performs convolution on input 2402 by applying a 3×1 convolution with parameters C and C21. Convolution unit 2408 performs convolution on the output of convolution unit 2406 by applying a 1×3 convolution with parameters C21 and C22.

PReLU unit 2410 performs an activation function on the outputs of convolution unit 2404 and convolution unit 2408. Convolution unit 2412 performs convolution on the output of PReLU unit 2410 by applying a 1×1 convolution with parameters C1, C22, and C. Convolution unit 2414 performs convolution on the output of convolution unit 2412 by applying a 1×3 convolution with parameters C and C31. Convolution unit 2416 performs convolution on the output of convolution unit 2414 by applying a 3×1 convolution with parameters C31 and C.

Transformer block 2418 receives the output of convolution unit 2416 and applies an attentional mechanism (also called a non-local attention) that captures distant, non-local correlations, relative to a current block and non-proximate samples to the current block. That is, the various units or blocks of backbone block 2400 that are similar to units and blocks of backbones 1900-2200 may be configured to capture local correlations, relative to the current block and samples proximate the current block. Transformer block 2418 may be configured to capture distant, non-local correlations. In this manner, the example techniques may be able to account for long-range dependencies (e.g., correlations with non-proximate samples in a current block).

For instance, as described in more detail, transformer block 2418 may include an attention block and a feed forward network (FFN). The attention block may be configured to generate features, based on applying an attention mechanism, that capture the distant, non-local correlations, relative to the current block and the non-proximate samples, in the picture for processing. That is, the output of the attention block may be features, and these features may capture the distant, non-local correlations, relative to the current block and the non-proximate samples, in the picture for processing, such as by the FFN. The attention mechanism may be based on a query matrix, a key matrix, and a value matrix, as described in more detail.

For example, video encoder 200 or video decoder 300 (e.g., part of in-loop filtering) may be configured to filter a current block of a picture of the video data, through a neural network and based on local correlations of proximate samples and distant, non-local correlations of non-proximate samples relative to the current block, to generate a filtered current block. In the example illustrated in FIG. 24, transformer block 2418 may be configured to generate an attention map, using the query and key matrix) based on global information and perform the attention mechanism that captures distant, non-local correlations.

For instance, the neural network includes one or more backbone blocks (e.g., like backbone block 2400) and one or more transformer blocks (e.g., like transformer block 2418). Each of the one or more transformer blocks (e.g., transformer block 2418) is associated with a backbone block 2400 of the one or more backbone blocks. For example, transformer block 2418 is part of the backbone block 2400 and receives an intermediate output of an internal component of the backbone block 2400. For example, transformer block 2418 receives output from convolution unit 2416, which is an intermediate output of an internal component of residual backbone block 2400 (e.g., convolution unit 2416 is an internal component of backbone block 2400).

At least one of the backbone blocks (e.g., backbone block 2400) may be configured to capture the local correlations, relative to a current block and proximate samples of the current block. For example, convolution units 2404, 2406, and 2408 may be configured to capture the local correlations, relative to a current block and the samples proximate the current block.

Figure 25:
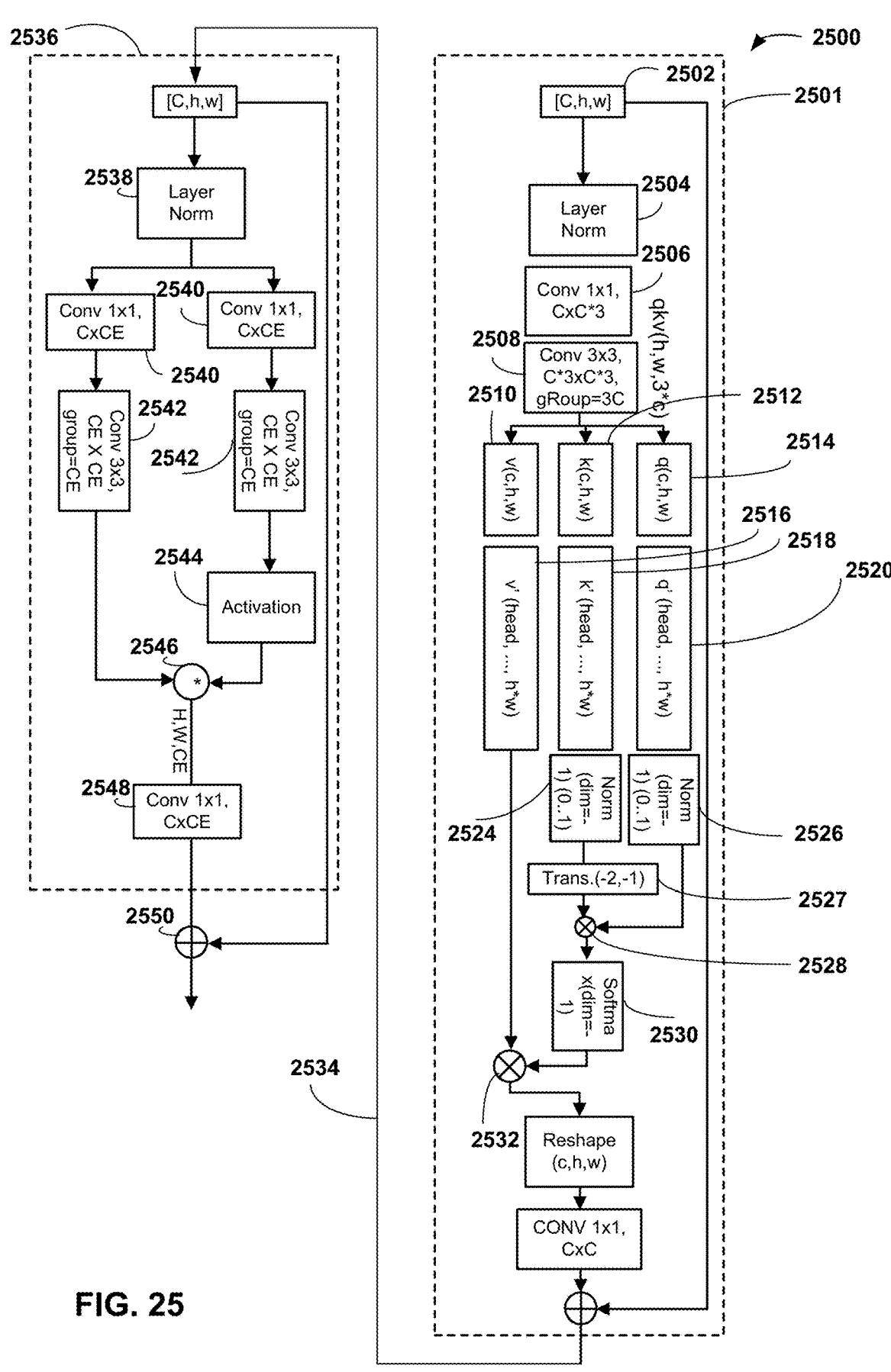
FIG. 25 is a block diagram illustrating an example of a transformer block for a unified filter architecture.

At least one of the transformer blocks (e.g., transformer block 2418) may be configured to generate features, based on applying an attention mechanism, that capture the distant, non-local correlations, relative to the current block and the non-proximate samples, in the picture for processing. That is, transformer block 2418 may be configured to perform an attention mechanism that captures distant, non-local correlations, relative to the current block and the non-proximate samples, in the picture for processing. For example, as illustrated in FIG. 25, transformer block 2418 may generate query, key, and value components that used to apply (e.g., perform) an attention mechanism.

In general, one or more example transformer blocks described in this disclosure may be based on a self-attention mechanism, as a non-limiting example. Transformer block 2418 may be perform a self-attention, or scaled dot-product attention, by computing a weighted representation of the input sequence by allowing the neural network of which transformer block 2418 is part to weigh the importance of different values in relation to each other. For example, in transformer block 2418, the attention map may be computed by using the query and key component based on the global information related to a block, and the attention mechanism is further performed by using a transposed matrix multiplication to the value component, where the query, key and value components are features computed from the same input with linear/nonlinear functions. The input may be based on a luma component and one or more chroma components of the picture or features extracted from the luma component and one or more chroma components.

Transformer block 2418 may use three matrices or vectors, query (q) matrix or vector, key (k) matrix or vector, and value (v) matrix or vector, which may also be referred to as q component, k component, and v component, respectively. The use of the query matrix, key matrix, and/or value matrix may be referred to as applying attention mechanism that captures the distant, non-local correlations, relative to the current block and the non-proximate samples, in the picture for processing. For instance, for filtering a current block, transformer block 2418 may utilize the q component, k component, and v component to generate features for processing, where the features capture the distant, non-local correlations, relative to the current block and the non-proximate samples, in the picture for processing. In this manner, filtering the current block may not be limited to proximate samples and local correlations, but incorporates an attention mechanism to capture distant, non-local correlations of non-proximate samples.

The query vector represents the current input values for which the neural network for filtering is trying to find relevant context or information from other samples in the sequence. The key vector is associated with each input in the input sequence and can be thought of as a tag or identifier that represents what specific inputs values are about. The value vector holds the actual information that will be combined to create the output representation.

Transformer block 2418 may determine query matrix as Q=XWq, key matrix as K=XWk, and value matrix as V=XWv. X may be the input sequence (e.g., input values), and Wq, Wk, and Wv may be learned weighted matrices for the query matrix, key matrix, and value matrix. In one or more examples, the Wq, Wk, and Wv matrices may be learned, during a learning phase, based on training data where samples in addition to the proximate samples of a current block are used to train the neural network used for filtering. In this manner, the attention mechanism that transformer block 2418 applies (e.g., performs) captures distant, non-local correlations, relative to the current block and the non-proximate samples. That is, Wq, Wk, and Wv may be learned matrices. Then during inference, where transformer block 2418 is operating on current video data, including a current block, video encoder 200 and video decoder 300 may be able to perform filtering on the current block using distant, non-local correlations that are captured through the use of the Wq, Wk, and Wv matrices (e.g., with matrix multiplication, including transposed matrix multiplication).

In one or more examples, transformer block 2418 may also include a feed forward network that receives the features after applying the attention mechanism, and performs additional operations so that the information (e.g., features) are in condition for further processing and to refine the features so that the features are more informative. For example, backbone block 2400 may be in a cascade chain of backbone blocks that together form a portion of the neural network based filter. The feed forward network of transformer block 2418 may generate information that can be fed to the next backbone block in the cascade chain.

Adder unit 2420 may add the output from transformer block 2418 and input 2402. The output of adder unit 2420 may be the output values 2422 that is further processed by the next backbone block in the cascade. Adder unit 2420 may not be needed in all examples, and the output of transformer block 2418 may be output values 2422.

FIG. 25 shows example of transformer block architecture for transformer block 2500, in which the query (q), key (k), and value (v) component are created from the input. Transformer block 2500 is an example of transformer block 2418 of FIG. 24. Transformer block 2500 includes attention block 2501 and feed forward network (FFN) 2536.

As described in more detail, in FIG. 25, after the channel arrangement, which prepares for performing the attention mechanism, the matrix multiplication between the query and key matrices generates the attention map. This attention map is translated into a weight matrix of probability after the Softmax layers. Applying the weight matrix with the value matrix, information from other channels are aggregated to the each channel. In addition, when multiple heads are used in the transformer, the attention from each head is computed separately, and the results are aggregated.

For example, the input to attention block 2501 is input 2502, which may be intermediate output of an internal component of a backbone block or an output from a backbone block, like backbone blocks 1900 to 2400. For instance, input 2502 may be the output of convolution unit 2416 (FIG. 24). However, the input 2502 may be values such as the output of convolution unit 2608 (FIG. 26) (e.g., which is an internal component of backbone block 2600) or the output of backbone block 2700 (FIG. 27).

Layer norm unit 2504 (e.g., term Layer Norm) may define the process of Layer Normalization, that uses the distribution of all inputs to a layer to compute a mean and variance which are then used to normalize the input to that layer. Convolution unit 2506 may apply a 1×1 convolution to the output of layer norm unit 2504. Convolution unit 2508 may apply a 3×3 depth-wise convolution to the output of convolution unit 2506, and generate value matrix 2510, key matrix 2512, and query matrix 2514. For instance, convolution unit 2506 and 2508 may determine query matrix 2514 as Q=XWq, key matrix 2512 as K=XWk, and value matrix 2510 as V=XWv. X may be the input sequence (e.g., input values), and Wq, Wk, and Wv may be learned weighted matrices for the query matrix 2514, key matrix 2512, and value matrix 2510.

In one or more examples, video encoder 200 and video decoder 300 may generate q(head, c/head, h*w) matrix, k'(head, c/head, h*w) matrix, and v(head, c/head, h*w) matrix, where "head" is a parameter used for dividing the processing across different processing circuitry. The use of q(head, c/head, h*w) matrix, k'(head, c/head, h*w) matrix, and v(head, c/head, h*w) matrix is not needed in all examples. The k'(head, c/head, h*w) matrix is used to indicate the rearrangement of the k(c, h, w) matrix.

Norm unit 2526 may normalize the values from the query matrix or after rearrangement/reshaping using "head" to values between 0 and 1. Norm unit 2524 may normalize the values from the key matrix or after arrangement using "head," to values between 0 and 1. That is, term Norm defines the process of input normalization, rescaling magnitude of the input samples to the range 0 . . . 1. Transpose unit 2527 may be configured to perform a transpose of the result of apply the key matrix 2512.

Matrix multiplier 2528 may multiply the output of norm unit 2526 and the transpose of output of norm unit 2524 (e.g., output of transpose unit 2527) to generate an attention map. That is, operation matrix multiplication is defined by term ⊗ in FIG. 25. In this manner, transformer block 2500 may perform a matrix multiplication between a query matrix (e.g., output of norm unit 2526) and a transposed key matrix (e.g., output of norm unit 2524 after transposing with transpose unit 2527) to generate an attention map. As described, the query matrix 2514 and the key matrix 2512 may be generated based on an input that includes a luma component and one or more chroma components of the picture. That is, the input may include a luma component and one or more chroma components of the picture or features extracted from the luma component and the one or more chroma components.

Transformer block 2500 may translate the attention map into a weight matrix of probability. For example, the matrix multiplication between the query and key matrices transposed (e.g., outputs of norm unit 2526 and norm unit 2524 after transposing with transpose unit 2527) generates the attention map in a channel-wise manner. This attention map is translated into a weight matrix of probability after the softmax unit 2530. For example, Operation SoftMax of softmax unit 2530 may be a normalized exponential function that is used as an activation function of a neural network to normalize the output of a network to a probability distribution over predicted output classes. For each input element $z_i$, softmax unit 2530 applies exponential function and normalizes these values by dividing them by the sum of these exponential functions:

$$\sigma(\vec{z})_i = \frac{e^{z_i}}{\sum_{j=1}^{K} e^{z_j}}$$

Matrix multiplier 2532 may multiply the output of softmax unit 2530 with the value matrix 2510 or possibly after the "head" reshaping operation. After the multiplication, attention block 2501 may perform additional processing to generate features 2534 that capture the distant, non-local correlations, relative to the current block and the non-proximate samples, in the picture for processing. In this manner, attention block 2401 of transformer block 2500 may generate features, based on applying an attention mechanism, that capture the distant, non-local correlations, relative to the current block and the non-proximate samples, in the picture for processing. Applying the weight matrix with the value matrix, information from other channels are aggregated to the each channel. Stated another way, transformer block 2500 may apply the weight matrix (e.g., output from softmax unit 253) to a value matrix 2510 or 2516 to apply the attention mechanism. The value matrix 2510 or 2516 may be generated from the input 2502.

The transformer block 2500 may also include a Feed Forward Network (FFN) 2536. The FFN 2536 further process the information (e.g., features 2534 generating by applying the attention mechanism) to provide a more flexible representation of the output for the training or inference. In FFN 2536, layer norm unit 2538 may perform similar operations as layer norm unit 2504. Convolution unit 2540 may perform 1×1 convolution, and convolution unit 2542 may perform 3×3 depth-wise convolution. There may be two branches out of convolution unit 2542. A first branch includes activation unit 2544, which may be implemented as point-wise non-linearity, examples of which may include Gaussian Error Linear Unit (GELU), Rectified Linear Unit (ReLU) or other implementations. The output from the activation unit 2544 may be one input to point-wise multiplier 2546. The other input to matrix multiplier 2546 may be the output from convolution unit 2542. Point-wise multiplication is defined by term in ⊙ FIG. 25. The output of matrix multiplier 2546 may be further processed by convolution unit 2548 and added by adder 2550 to the extracted features by using the features 2534 to generate an output that is further processed as an input to the next backbone block (such as the example of FIGS. 24 and 27) or to the next component inside a backbone block (such as the example of FIG. 26).

In some examples, different configuration of Transform and ResNet architectures may be used to achieve a target complexity-performance tradeoff. Non-limiting examples are described below, such as number of backbone blocks, rank of decomposition, and transformer architecture.

For the number of backbone blocks, introduction of transformer blocks (e.g., like transformer block 2500) may increase computation complexity. To keep the complexity under the certain constraint, number of residual transformer-enabled blocks may be lower than number of residual block without transformer. That is, there may be some backbone blocks without an associated transformer block, but there may be other backbone blocks that are each associated with a transformer block. In some examples, ILF architecture with Transformer in backbone may be in range of 3 to 14 backbone blocks for Luma or for joint luma/chroma processing.

For rank of decomposition, in some examples, rank of the separable convolutions may be reduced (similarly to examples described above) for filter architecture with transformers. Example of such architecture may be ILF filter described above with C31=48 or smaller than number of input channels C.

For transformer architecture, to control complexity of the Transformer block (e.g., like transformer block 2500), several configuration parameters can be used. Examples of those include: factor intermediate channel expansion within FFN part of transformer can be within range of C*1*3 . . . C*4*3 or higher, with C being number of input channels. In some examples, number of transformer heads can be set equal to 1, 2, 4, 8 or higher. In some examples, number of the intermediate channels resulting from Transformer heads can be altered to be dividable by 16 or 8, or 4 or 2.

In some examples, spatial attention between non-overlapping block of size N×N within each channel can be applied, where the parameter N can be set as 2, or 3, etc. In some examples, a simplified feed forward network (FFN) can be utilized, where it only consists of convolution and activation layers (e.g. omitting Layer Normalization). In some examples, transformer block may be placed outside of the ResBlock of the backbone or in a one of the multi-scalar branches of the residual block (e.g., backbone block), as shown in two examples of FIGS. 26 and 27.

Figure 26:
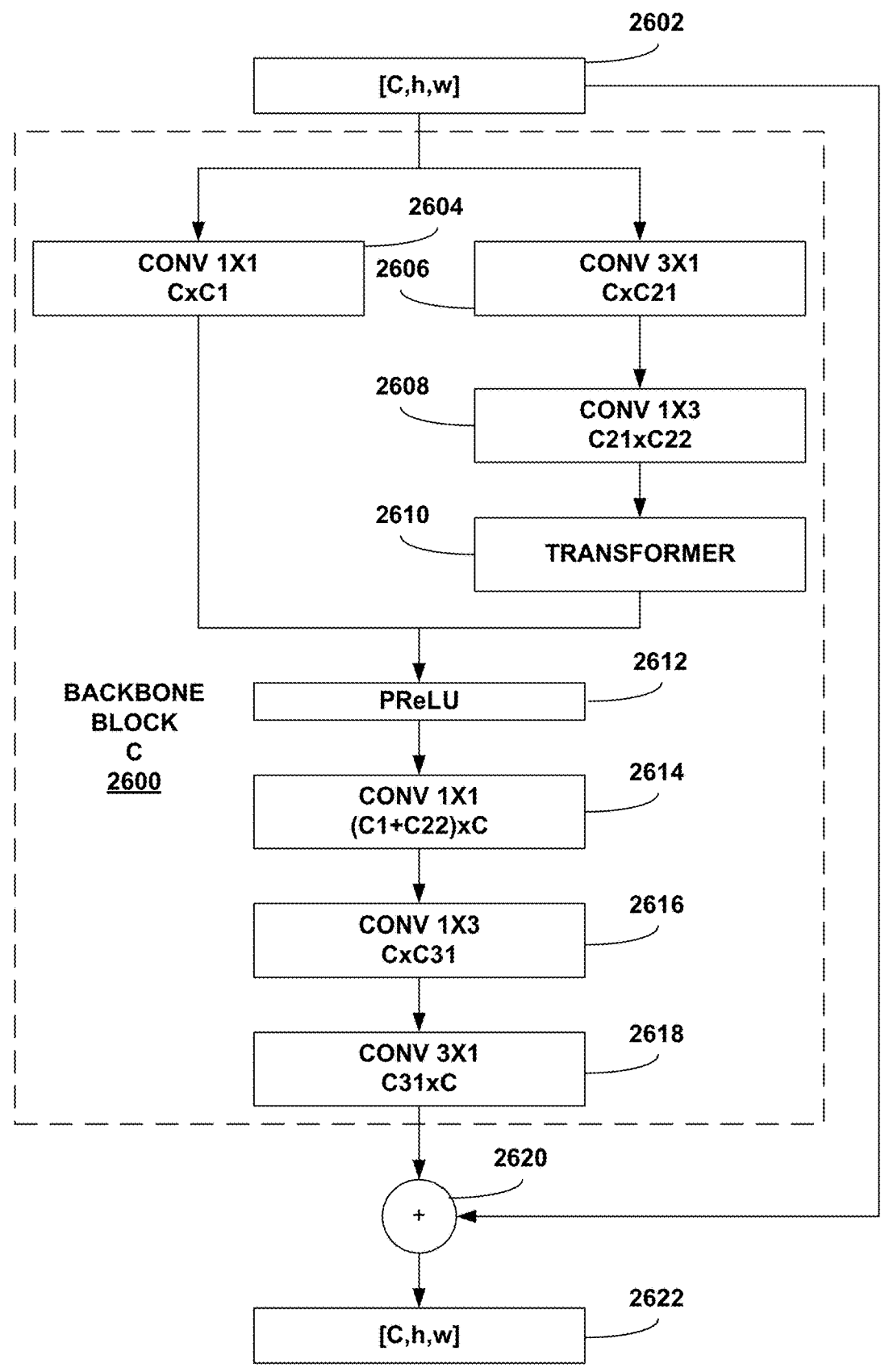
FIG. 26 is an example block diagram illustrating a transformer block for ResNet Architecture.
Figure 27:
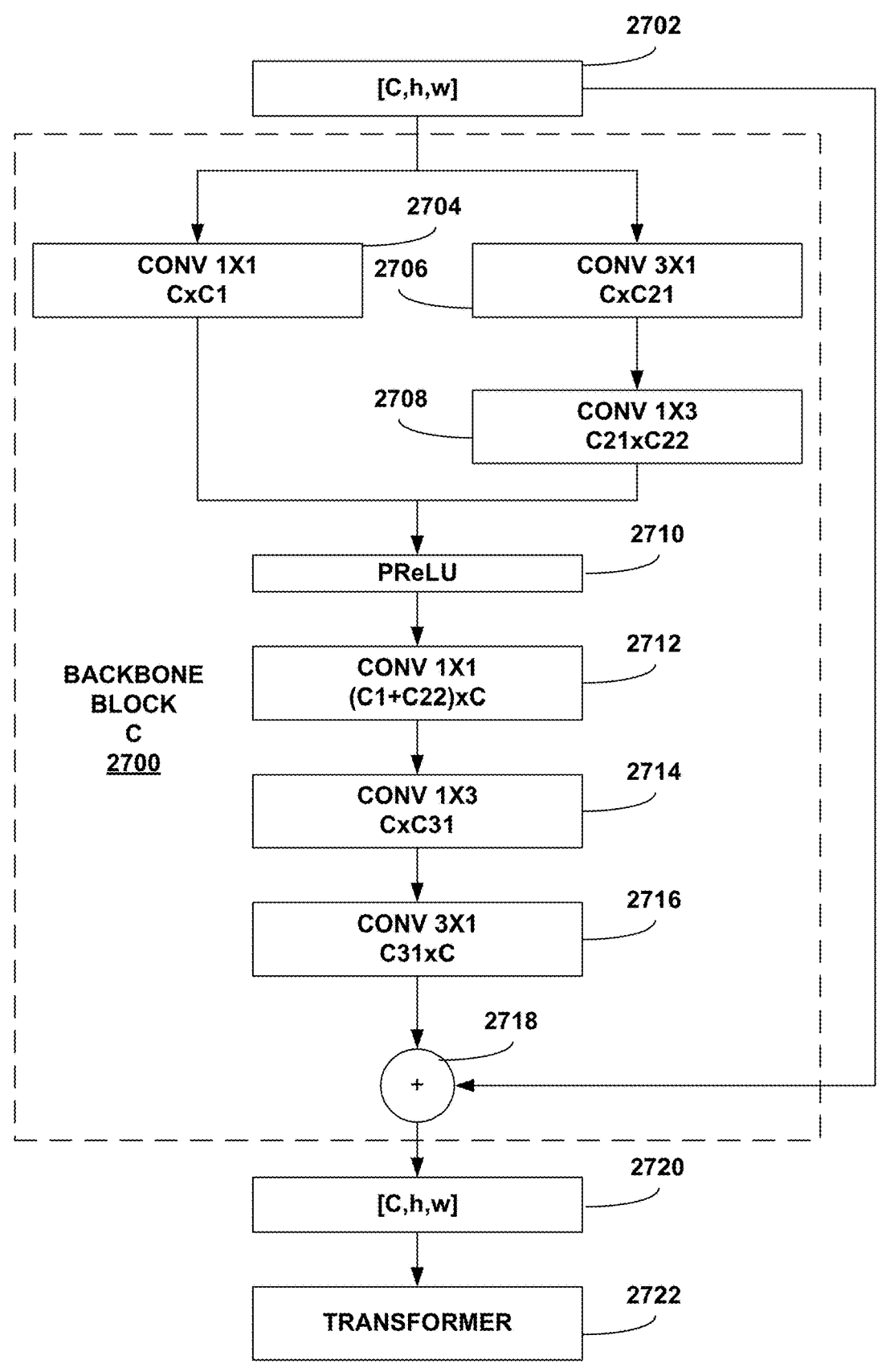
FIG. 27 is another example block diagram illustrating a transformer block for ResNet Architecture.

In FIG. 26, the input to backbone block 2600 is input 2602, which includes a channel (c), height (h), and width (w) of a block. Convolution unit 2604 performs convolution on input 2602 by applying a 1×1 convolution with parameters C and C1. Convolution unit 2606 performs convolution on input 2602 by applying a 3×1 convolution with parameters C and C21. Convolution unit 2608 performs convolution on the output of convolution unit 2606 by applying a 1×3 convolution with parameters C21 and C22.

Transformer block 2610 generates features, based on applying an attention mechanism, that capture the distant, non-local correlations, relative to the current block and the non-proximate samples and performs feed forward network operations based on the output of convolution unit 2608. Example of transformer block 2610 includes transformer block 2500.

PReLU unit 2612 performs an activation function on the outputs of convolution unit 2604 and transformer block 2610. Convolution unit 2614 performs convolution on the output of PReLU unit 2612 by applying a 1×1 convolution with parameters C1, C22, and C. Convolution unit 2616 performs convolution on the output of convolution unit 2614 by applying a 1×3 convolution with parameters C and C31. Convolution unit 2618 performs convolution on the output of convolution unit 2616 by applying a 3×1 convolution with parameters C31 and C.

Adder unit 2620 may add the output from convolution unit 2618 and input 2602. The output of adder unit 2620 may be the output values 2622 that is further processed by the next backbone block in the cascade. Adder unit 2620 may not be needed in all examples, and the output of convolution unit 2618 may be output values 2622.

In FIG. 27, the input to backbone block 2700 is input 2702, which includes a channel (c), height (h), and width (w) of a block. Convolution unit 2704 performs convolution on input 2702 by applying a 1×1 convolution with parameters C and C1. Convolution unit 2706 performs convolution on input 2702 by applying a 3×1 convolution with parameters C and C21. Convolution unit 2708 performs convolution on the output of convolution unit 2706 by applying a 1×3 convolution with parameters C21 and C22.

PReLU unit 2710 performs an activation function on the outputs of convolution unit 2704 and convolution unit 2708. Convolution unit 2712 performs convolution on the output of PReLU unit 2710 by applying a 1×1 convolution with parameters C1, C22, and C. Convolution unit 2714 performs convolution on the output of convolution unit 2712 by applying a 1×3 convolution with parameters C and C31. Convolution unit 2716 performs convolution on the output of convolution unit 2714 by applying a 3×1 convolution with parameters C31 and C.

Adder unit 2718 may add the output from convolution unit 2716 and input 2702. The output of adder unit 2718 may be the output values 2720. Adder unit 2718 may not be needed in all examples, and the output of convolution unit 2716 may be output values 2720.

Transformer block 2722 generates features, based on applying an attention mechanism, that capture the distant, non-local correlations, relative to the current block and the non-proximate samples and performs feed forward network operations based on output values 2720. Example of transformer block 2722 includes transformer block 2500.

The example techniques described in this disclosure may be applicable to all the NN models of different functionality and of different types of architecture and modules, which employ the integer implementation and apply quantization. Utilization of the example techniques may reduce computation complexity and memory bandwidth requirements and provide a better performance. The examples described in this disclosure are related to NN-assisted loop filtering, however, the example techniques are applicable to other NN-based video coding tool, as well, that consume input data with certain statistical properties, such as static content or sparse representation.

Figure 28:
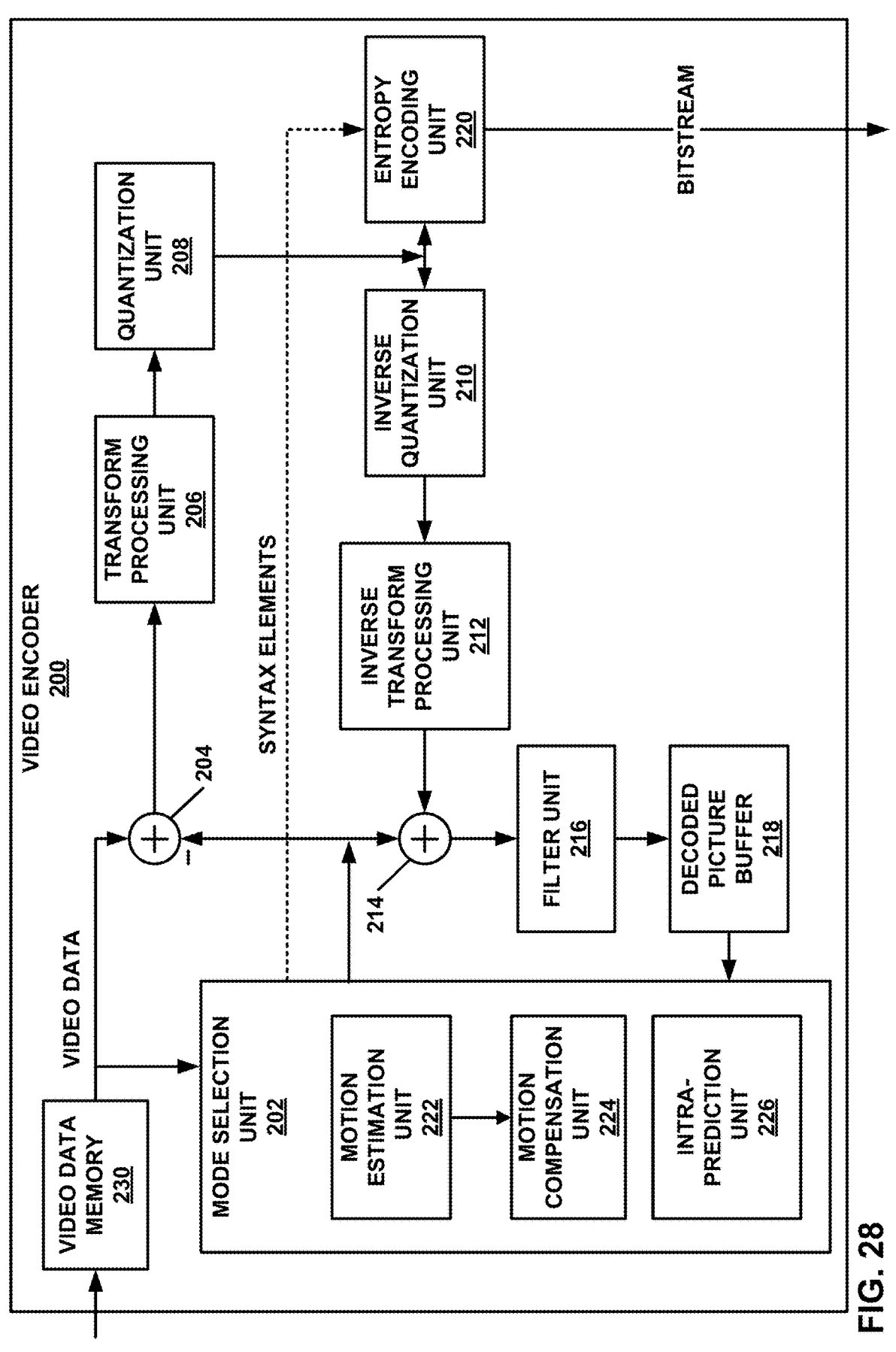
FIG. 28 is a block diagram illustrating an example video encoder that may perform the techniques of this disclosure.

FIG. 28 is a block diagram illustrating an example video encoder 200 that may perform the techniques of this disclosure. FIG. 28 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 28, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 28 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. Filter unit 216 may be configured to perform any of the NN-based video coding techniques described above.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to receive a picture of video data; reconstruct the picture of video data; and perform a NN-based filter process on the reconstructed picture of video data.

Figure 29:
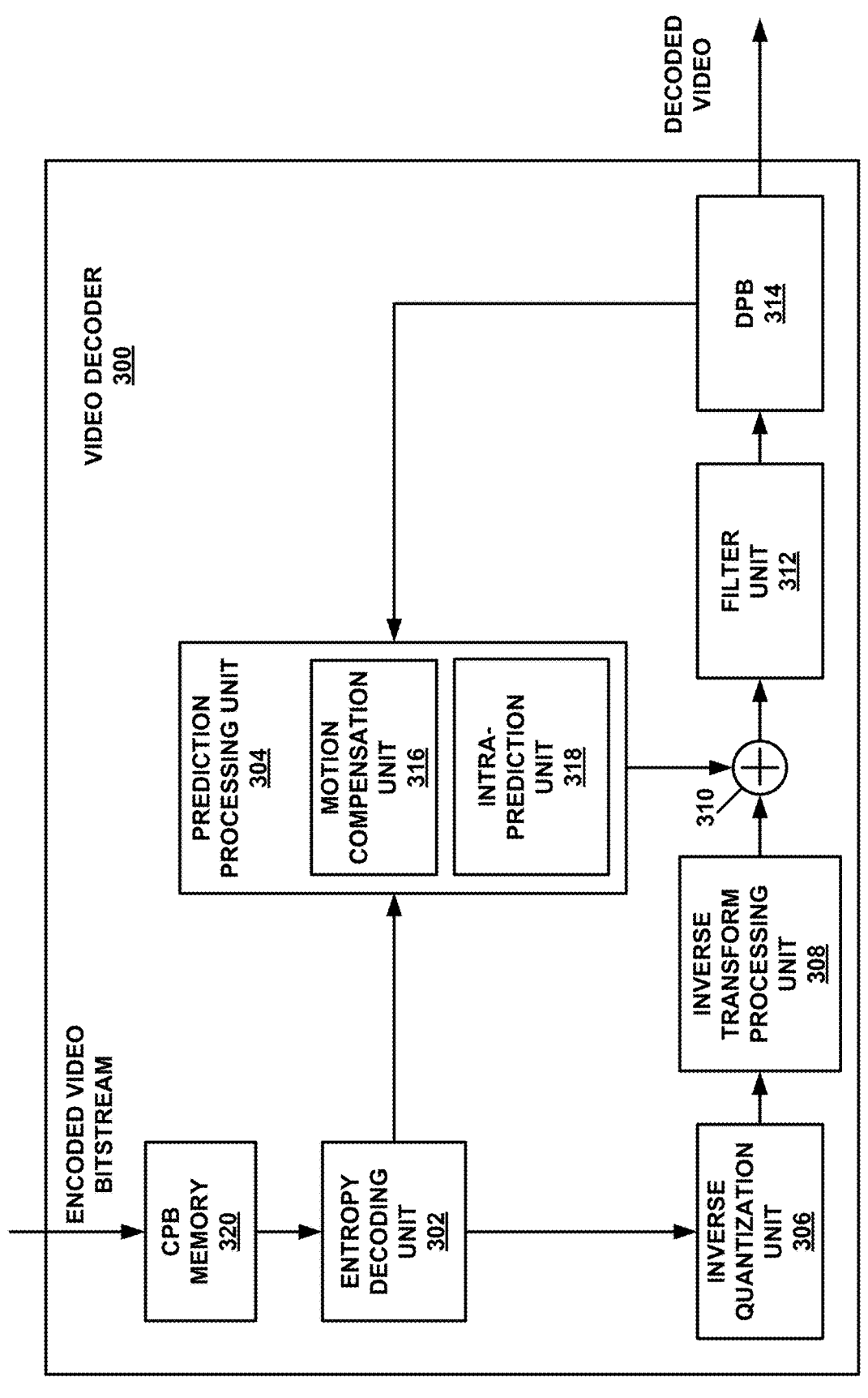
FIG. 29 is a block diagram illustrating an example video decoder that may perform the techniques of this disclosure.

FIG. 29 is a block diagram illustrating an example video decoder 300 that may perform the techniques of this disclosure. FIG. 29 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 29, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 29 are illustrated to assist with understanding the operations performed by video decoder 300. The units may be implemented as fixed-function circuits, programmable circuits, or a combination thereof. Similar to FIG. 28, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream. Filter unit 312 may be configured to perform any of the NN-based video coding techniques described above.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 28).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 28).

Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a device configured to receive a picture of video data; reconstruct the picture of video data; and perform a NN-based filter process on the reconstructed picture of video data.

Figure 30:
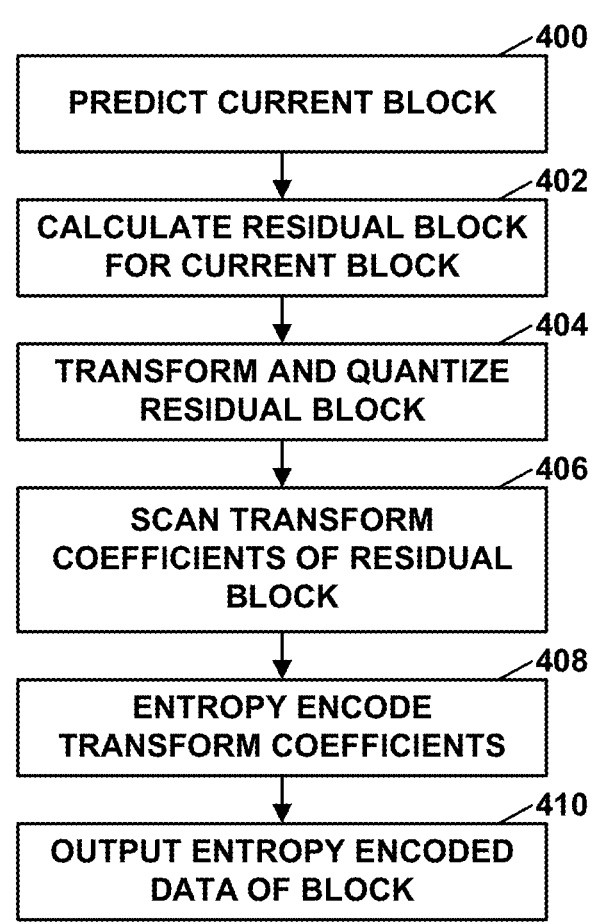
FIG. 30 is a flowchart illustrating an example method for encoding a current block in accordance with the techniques of this disclosure.

FIG. 30 is a flowchart illustrating an example method for encoding a current block in accordance with the techniques of this disclosure. The current block may be or include a current CU. Although described with respect to video encoder 200 (FIGS. 1 and 28), it should be understood that other devices may be configured to perform a method similar to that of FIG. 30.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410). In one or more examples, video encoder 200 may reconstruct a current block, and may perform the example filtering techniques such that inter-prediction can be performed on a subsequent block using the filtered current block.

FIG. 31 is a flowchart illustrating an example method for decoding a current block of video data in accordance with the techniques of this disclosure. The current block may be or include a current CU. Although described with respect to video decoder 300 (FIGS. 1 and 29), it should be understood that other devices may be configured to perform a method similar to that of FIG. 30.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510). In one or more examples, video decoder 300 may reconstruct a current block, and may perform the example filtering techniques such that inter-prediction can be performed on a subsequent block using the filtered current block.

Figure 32:
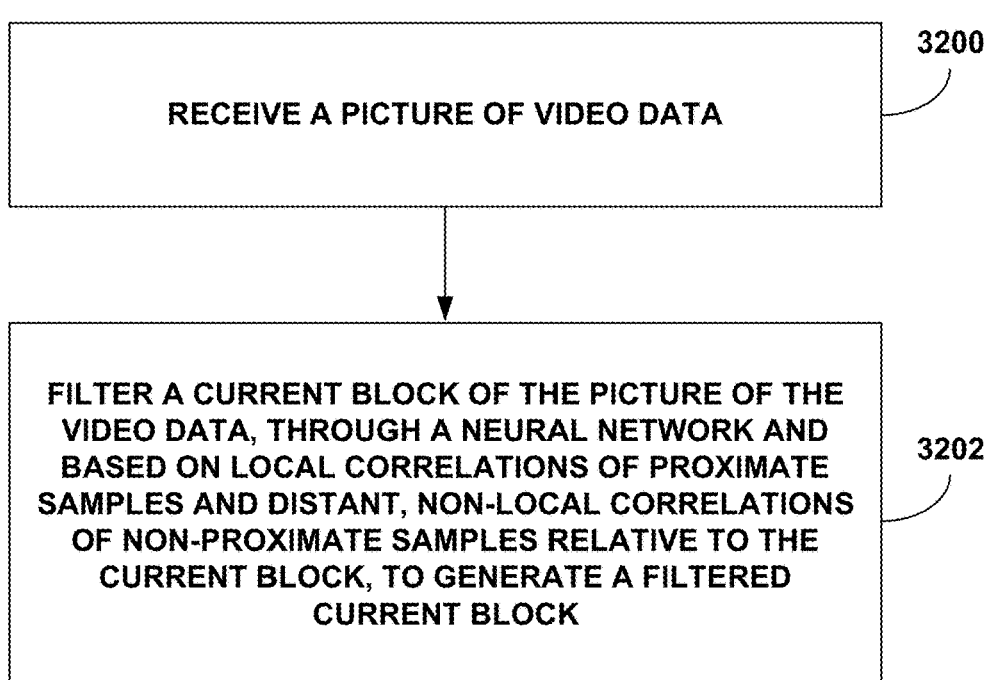
FIG. 32 is a flowchart illustrating an example method of operation in accordance with techniques of this disclosure.

FIG. 32 is a flowchart illustrating an example method of operation in accordance with techniques of this disclosure. The example techniques of FIG. 32 may be performed by video encoder 200 (e.g., in filter unit 216) or by video decoder 300 (e.g., in filter unit 312). For example, filter unit 216 or filter unit 300 may be configured to implement the neural network (e.g., a convolutional neural network (CNN)) and, in some examples, having a residual neural network (ResNet) architecture. Filter unit 216 or filter unit 300 may be configured to perform the operations of the unified filter, like FIG. 23 that includes one or more backbone blocks and associated transformer blocks, such as those of FIGS. 24-27.

Video encoder 200 and video decoder 300 may receive a picture of video data (3200). For example, for video encoder 200, the picture of the video data may be part of the reconstruction loop that includes reconstruction unit 214, and may be the output of reconstruction unit 214 that is an input to filter unit 216. For video decoder 300, the picture of the video data may be the output of reconstruction unit 310 that is an input to filter unit 312.

Video encoder 200 and video decoder 300 may filter a current block of the picture of the video data, through a neural network and based on local correlations of proximate samples and distant, non-local correlations of non-proximate samples relative to the current block, to generate a filtered current block (3202). For example, video encoder 200 and video decoder 300 may implement a neural network that includes one or more backbone blocks and one or more transformer blocks. Each of the one or more transformer blocks is associated with a backbone block of the one or more backbone blocks. For example, a first transformer block is associated with a first backbone block. The first transformer block may be one of part of the first backbone block and receives an intermediate output of an internal component of the first backbone block (e.g., like transformer block 2418 (FIG. 24) or transformer block 2610 (FIG. 26)), or external to the first backbone block and receives an output of the first backbone block (e.g., like transformer block 2722 (FIG. 27)).

In one or more examples, at least one of the backbone blocks is configured to capture the local correlations, relative to the current block and the proximate samples of the current block. At least one of the transformer blocks is configured to generate features, based on applying an attention mechanism, that capture the distant, non-local correlations, relative to the current block and the non-proximate samples, in the picture for processing.

For example, to apply the attention mechanism, video encoder 200 and video decoder 300 may be configured to perform, with the at least one of the transformer blocks, a matrix multiplication between a query matrix and a transposed key matrix to generate an attention map, the query matrix and the key matrix being generated based on an input that includes a luma component and one or more chroma components of the picture or their extracted features. For example, matrix multiplier 2528 may multiply the output of norm unit 2526 and norm unit 2524 (e.g., after transpose but not limited to always requiring a transposing), where the output of norm unit 2526 is based on the query matrix 2514 or 2520, and the output of norm unit 2524 is based on the key matrix 2512 or 2518 (possibly transposed).

Video encoder 200 or video decoder 300 may be configured to translate, with the at least one of the transformer blocks, the attention map into a weight matrix of probability. For example, softmax unit 2530 may be configured to translate the attention map into a weight matrix of probability.

Video encoder 200 and video decoder 300 may apply, with the at least one of the transformer blocks, the weight matrix to a value matrix to generate the features that capture the distant, non-local correlations, relative to the current block and the non-proximate samples, the value matrix being generated from the input. For example, matrix multiplier 2532 may multiply value matrix 2510 or 2516 with the output of softmax unit 2530, which is used to generate the features 2534 extracted from the attention mechanism.

In one or more example, video encoder 200 and video decoder 300 may generate, based on the features 2534 and with a feed forward network 2536, information for further processing to generate the filtered current block. That is, the output of feed forward network 2536 may be an output to the next backbone block in the cascade of backbone blocks, as illustrated in FIG. 23.

The filtered block may be utilized for various purposes. As one example, from the perspective of video decoder 300, the filtered block may the block that the displayed. For both video encoder 200 and video decoder 300, the filtered block may be used for inter-predicting a subsequent block.

The following numbered clauses illustrate one or more aspects of the devices and techniques described in this disclosure.

Clause 1A: A method of processing video data, the method comprising: receiving a picture of the video data; and processing the picture of the video data through a neural network, the neural network comprising one or more backbone blocks and one or more transformer blocks, wherein each of the one or more transformer blocks is associated with a backbone block of the one or more backbone blocks, and wherein at least one of the transformer blocks is configured to capture distant, non-local relevance, relative to a current block, in the picture for processing.

Clause 2A. The method of clause 1A, wherein the at least one of the transformer blocks is configured to: perform a matrix multiplication between one or more query values and one or more key values to generate a cross-correlation between channels, the one or more query values and the one or more key values being generated from an input that includes a luma component and one or more chroma components of the picture; translate the cross-correlation between channels into a weight matrix of probability; and apply the weight matrix to a value matrix, the value matrix being generated from the input.

Clause 3A. The method of clause 2A, wherein the channels comprise a luma channel for the luma component and a chroma channel for the one or more chroma components.

Clause 4A. The method of any of clauses 1A-3A, wherein the backbone blocks of the neural network are configured to extract features including object detection and semantic segmentation.

Clause 5A. The method of any of clauses 1A-4A, wherein the neural network is a convolutional neural network (CNN).

Clause 6A. The method of any of clauses 1A-5A, wherein the neural network includes a residual neural network (ResNet) architecture.

Clause 7A. The method of any of clauses 1A-6A, wherein processing the picture of the video data through the neural network comprises processing the picture of the video data through the neural network during a training process of the neural network.

Clause 8A. The method of any of clauses 1A-6A, wherein processing the picture of the video data through the neural network comprises processing the picture of the video data through the neural network after training of the neural network.

Clause 9A. The method of any of clauses 1A-8A, wherein processing the picture of the video data comprises processing the picture of the video data as part of filtering the picture.

Clause 10A. The method of clause 9A, wherein the filtering comprises at least one of an in-loop filter or an adaptive loop filter.

Clause 11A. The method of any of clauses 1A-10A, wherein processing the picture comprises processing the picture as part of video decoding.

Clause 12A. The method of any of clauses 1A-10A, wherein processing the picture comprises processing the picture as part of video encoding.

Clause 13A. A device for processing video data, the device comprising: one or more memories configured to store the video data; and processing circuitry configured to perform the method of any one or combination of clauses 1A-12A.

Clause 14A. The device of clause 13A, further comprising a display configured to display decoded video data.

Clause 15A. The device of any of clauses 13A and 14A, wherein the device comprises one or more of a camera, a computer, a mobile device, a broadcast receiver device, or a set-top box.

Clause 16A. The device of any of clauses 13A-15A, wherein the device comprises a video decoder.

Clause 17A. The device of any of clauses 13A-15A, wherein the device comprises a video encoder.

Clause 18A. A computer-readable storage medium having stored thereon instructions that, when executed, cause one or more processors to perform the method of any of clauses 1A-12A.

Clause 19A. A device for processing video data, the device comprising means for performing the method of any one or combination of clauses 1A-12A.

Clause 1. A method of processing video data, the method comprising: receiving a picture of the video data; and filtering a current block of the picture of the video data, through a neural network and based on local correlations of proximate samples and distant, non-local correlations of non-proximate samples relative to the current block, to generate a filtered current block, wherein the neural network comprises one or more backbone blocks and one or more transformer blocks, wherein each of the one or more transformer blocks is associated with a backbone block of the one or more backbone blocks, and wherein at least one of the backbone blocks is configured to capture the local correlations, relative to the current block and the proximate samples of the current block, and wherein at least one of the transformer blocks is configured to generate features, based on applying an attention mechanism, that capture the distant, non-local correlations, relative to the current block and the non-proximate samples, in the picture for processing.

Clause 2. The method of clause 1, wherein applying the attention mechanism comprises: performing, with the at least one of the transformer blocks, a matrix multiplication between a query matrix and a key matrix or a transposed key matrix to generate an attention map, the query matrix and the key matrix being generated based on an input that includes a luma component and one or more chroma components of the picture; translating, with the at least one of the transformer blocks, the attention map into a weight matrix of probability; and applying, with the at least one of the transformer blocks, the weight matrix to a value matrix to generate the features that capture the distant, non-local correlations, relative to the current block and the non-proximate samples, the value matrix being generated from the input.

Clause 3. The method of clause 2, further comprising generating, based on the features and with a feed forward network, information for further processing to generate the filtered current block.

Clause 4. The method of any of clauses 1-3, wherein a first transformer block is associated with a first backbone block, wherein the first transformer block is one of: part of the first backbone block and receives an intermediate output of an internal component of the first backbone block, or external to the first backbone block and receives an output of the first backbone block.

Clause 5. The method of any of clauses 1-4, wherein the neural network is a convolutional neural network (CNN).

Clause 6. The method of any of clauses 1-5, wherein the neural network includes a residual neural network (ResNet) architecture.

Clause 7. The method of any of clauses 1-6, wherein filtering the current block comprises at least one of an in-loop filtering or an adaptive loop filtering.

Clause 8. The method of any of clauses 1-7, further comprising inter-predicting a subsequent block based on the filtered current block.

Clause 9. The method of any of clauses 1-8, wherein filtering the current block comprises filtering the current block as part of video decoding.

Clause 10. The method of any of clauses 1-8, wherein filtering the current block comprises filtering the current block as part of video encoding.

Clause 11. A device for processing video data, the device comprising: one or more memories configured to store a picture of the video data; and processing circuitry coupled to the one or more memories and configured to: receive a picture of the video data; and filter a current block of the picture of the video data, through a neural network and based on local correlations of proximate samples and distant, non-local correlations of non-proximate samples relative to the current block, to generate a filtered current block, wherein the neural network comprises one or more backbone blocks and one or more transformer blocks, wherein each of the one or more transformer blocks is associated with a backbone block of the one or more backbone blocks, and wherein at least one of the backbone blocks is configured to capture the local correlations, relative to the current block and the proximate samples of the current block, and wherein at least one of the transformer blocks is configured to generate features, based on applying an attention mechanism, that capture the distant, non-local correlations, relative to the current block and the non-proximate samples, in the picture for processing.

Clause 12. The device of clause 11, wherein to apply the attention mechanism, the processing circuitry is configured to: perform, with the at least one of the transformer blocks, a matrix multiplication between a query matrix and a key matrix or a transposed key matrix to generate an attention map, the query matrix and the key matrix being generated based on an input that includes a luma component and one or more chroma components of the picture; translate, with the at least one of the transformer blocks, the attention map into a weight matrix of probability; and apply, with the at least one of the transformer blocks, the weight matrix to a value matrix to generate the features that capture the distant, non-local correlations, relative to the current block and the non-proximate samples, the value matrix being generated from the input.

Clause 13. The device of clause 12, wherein the processing circuitry is configured to generate, based on the features and with a feed forward network, information for further processing to generate the filtered current block.

Clause 14. The device of any of clauses 11 and 12, wherein a first transformer block is associated with a first backbone block, wherein the first transformer block is one of: part of the first backbone block and receives an intermediate output of an internal component of the first backbone block, or external to the first backbone block and receives an output of the first backbone block.

Clause 15. The device of any of clauses 11-14, wherein the neural network is a convolutional neural network (CNN).

Clause 16. The device of any of clauses 11-15, wherein the neural network includes a residual neural network (ResNet) architecture.

Clause 17. The device of any of clauses 11-16, wherein to filter the current block, the processing circuitry is configured to perform at least one of an in-loop filtering or an adaptive loop filtering.

Clause 18. The device of any of clauses 11-17, wherein the processing circuitry is configured to inter-predict a subsequent block based on the filtered current block.

Clause 19. The device of any of clauses 11-18, wherein to filter the current block, the processing circuitry is configured to filter the current block as part of video decoding.

Clause 20. One or more computer readable storage media storing instructions thereon that when executed cause one or more processors to: receive a picture of video data; and filter a current block of the picture of the video data, through a neural network and based on local correlations of proximate samples and distant, non-local correlations of non-proximate samples relative to the current block, to generate a filtered current block, wherein the neural network comprises one or more backbone blocks and one or more transformer blocks, wherein each of the one or more transformer blocks is associated with a backbone block of the one or more backbone blocks, and wherein at least one of the backbone blocks is configured to capture the local correlations, relative to the current block and the proximate samples of the current block, and wherein at least one of the transformer blocks is configured to generate features, based on applying an attention mechanism, that capture the distant, non-local correlations, relative to the current block and the non-proximate samples, in the picture for processing.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:

receiving a picture of the video data; and filtering a current block of the picture of the video data, through a neural network and based on local correlations of proximate samples and distant, non-local correlations of non-proximate samples relative to the current block, to generate a filtered current block, wherein the neural network comprises one or more backbone blocks and one or more transformer blocks, wherein each of the one or more transformer blocks is associated with a backbone block of the one or more backbone blocks, and wherein at least one of the backbone blocks is configured to capture the local correlations, relative to the current block and the proximate samples of the current block, and wherein at least one of the transformer blocks is configured to generate features, based on applying an attention mechanism that receives an input that includes a luma component and one or more chroma components of the picture, the features capturing the distant, non-local correlations, relative to the current block and the non-proximate samples, in the picture for processing.

2. The method of claim 1, wherein applying the attention mechanism comprises:

performing, with the at least one of the transformer blocks, a matrix multiplication between a query matrix and a key matrix or a transposed key matrix to generate an attention map, the query matrix and the key matrix being generated based on the input that includes the luma component and the one or more chroma components of the picture;

translating, with the at least one of the transformer blocks, the attention map into a weight matrix of probability; and applying, with the at least one of the transformer blocks, the weight matrix to a value matrix to generate the features that capture the distant, non-local correlations, relative to the current block and the non-proximate samples, the value matrix being generated from the input.

3. The method of claim 2, further comprising generating, based on the features and with a feed forward network, information for further processing to generate the filtered current block.

4. The method of claim 1, wherein a first transformer block is associated with a first backbone block, wherein the first transformer block is one of:

part of the first backbone block and receives an intermediate output of an internal component of the first backbone block, or

48 external to the first backbone block and receives an output of the first backbone block.

5. The method of claim 1, wherein the neural network is a convolutional neural network (CNN).

6. The method of claim 1, wherein the neural network includes a residual neural network (ResNet) architecture.

7. The method of claim 1, wherein filtering the current block comprises at least one of an in-loop filtering or an adaptive loop filtering.

8. The method of claim 1, further comprising inter-predicting a subsequent block based on the filtered current block.

9. The method of claim 1, wherein filtering the current block comprises filtering the current block as part of video decoding.

10. The method of claim 1, wherein filtering the current block comprises filtering the current block as part of video encoding.

11. A device for processing video data, the device comprising:

one or more memories configured to store a picture of the video data; and processing circuitry coupled to the one or more memories and configured to:

receive a picture of the video data; and filter a current block of the picture of the video data, through a neural network and based on local correlations of proximate samples and distant, non-local correlations of non-proximate samples relative to the current block, to generate a filtered current block, wherein the neural network comprises one or more backbone blocks and one or more transformer blocks, wherein each of the one or more transformer blocks is associated with a backbone block of the one or more backbone blocks, and wherein at least one of the backbone blocks is configured to capture the local correlations, relative to the current block and the proximate samples of the current block, and wherein at least one of the transformer blocks is configured to generate features, based on applying an attention mechanism that receives an input that includes a luma component and one or more chroma components of the picture, the features capturing the distant, non-local correlations, relative to the current block and the non-proximate samples, in the picture for processing.

12. The device of claim 11, wherein to apply the attention mechanism, the processing circuitry is configured to:

perform, with the at least one of the transformer blocks, a matrix multiplication between a query matrix and a key matrix or a transposed key matrix to generate an attention map, the query matrix and the key matrix being generated based on the input that includes the luma component and the one or more chroma components of the picture;

translate, with the at least one of the transformer blocks, the attention map into a weight matrix of probability; and apply, with the at least one of the transformer blocks, the weight matrix to a value matrix to generate the features that capture the distant, non-local correlations, relative to the current block and the non-proximate samples, the value matrix being generated from the input.

13. The device of claim 12, wherein the processing circuitry is configured to generate, based on the features and with a feed forward network, information for further processing to generate the filtered current block.

14. The device of claim 11, wherein a first transformer block is associated with a first backbone block, wherein the first transformer block is one of:

part of the first backbone block and receives an intermediate output of an internal component of the first backbone block, or external to the first backbone block and receives an output of the first backbone block.

15. The device of claim 11, wherein the neural network is a convolutional neural network (CNN).

16. The device of claim 11, wherein the neural network includes a residual neural network (ResNet) architecture.

17. The device of claim 11, wherein to filter the current block, the processing circuitry is configured to perform at least one of an in-loop filtering or an adaptive loop filtering.

18. The device of claim 11, wherein the processing circuitry is configured to inter-predict a subsequent block based on the filtered current block.

19. The device of claim 11, wherein to filter the current block, the processing circuitry is configured to filter the current block as part of video decoding.

20. One or more non-transitory computer readable storage media storing instructions thereon that when executed cause one or more processors to:

receive a picture of video data; and filter a current block of the picture of the video data, through a neural network and based on local correlations of proximate samples and distant, non-local correlations of non-proximate samples relative to the current block, to generate a filtered current block, wherein the neural network comprises one or more backbone blocks and one or more transformer blocks, wherein each of the one or more transformer blocks is associated with a backbone block of the one or more backbone blocks, and wherein at least one of the backbone blocks is configured to capture the local correlations, relative to the current block and the proximate samples of the current block, and wherein at least one of the transformer blocks is configured to generate features, based on applying an attention mechanism that receives an input that includes a luma component and one or more chroma components of the picture, the features capturing the distant, non-local correlations, relative to the current block and the non-proximate samples, in the picture for processing.

\* \* \* \* \*